(12) United States Patent
Onuma et al.

(10) Patent No.: US 9,277,178 B2
(45) Date of Patent: Mar. 1, 2016

(54) INFORMATION PROCESSING SYSTEM AND STORAGE MEDIUM

(71) Applicant: SONY CORPORATION, Tokyo (JP)

(72) Inventors: Tomoya Onuma, Shizuoka (JP); Yoichiro Sako, Tokyo (JP); Kohei Asada, Kanagawa (JP); Kazuyuki Sakoda, Chiba (JP); Katsuhisa Aratani, Kanagawa (JP); Kazuhiro Watanabe, Tokyo (JP); Takatoshi Nakamura, Kanagawa (JP); Mitsuru Takehara, Tokyo (JP); Akira Tange, Tokyo (JP); Hiroyuki Hanaya, Kanagawa (JP); Yuki Koga, Tokyo (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 14/021,089

(22) Filed: Sep. 9, 2013

(65) Prior Publication Data

US 2014/0078242 A1 Mar. 20, 2014

(30) Foreign Application Priority Data

Sep. 19, 2012 (JP) ................................. 2012-205460

(51) Int. Cl.
*H04N 7/14* (2006.01)
*H04N 7/15* (2006.01)
*H04M 3/42* (2006.01)
*H04M 3/56* (2006.01)

(52) U.S. Cl.
CPC . *H04N 7/15* (2013.01); *H04M 3/42* (2013.01); *H04M 3/56* (2013.01); *H04N 7/147* (2013.01)

(58) Field of Classification Search
None
See application file for complete search history.

(56) References Cited

U.S. PATENT DOCUMENTS

| 7,734,032 B1* | 6/2010 | Kiefhaber | H04M 3/523 379/265.01 |
| 8,462,976 B2* | 6/2013 | Tamaru | H04M 1/02 379/202.01 |
| 8,756,501 B1* | 6/2014 | Karam | H04L 51/32 715/700 |
| 2012/0054186 A1* | 3/2012 | Bhide | G06Q 10/10 707/740 |
| 2013/0227437 A1* | 8/2013 | Brody | H04L 12/1822 715/757 |

FOREIGN PATENT DOCUMENTS

| JP | H02-295269 A | 12/1990 |
| JP | 2004-343178 A | 12/2004 |

* cited by examiner

*Primary Examiner* — Maria El-Zoobi
(74) *Attorney, Agent, or Firm* — Sony Corporation

(57) ABSTRACT

There is provided an information processing system including an identifying unit that identifies a user and a target with whom the user requests to converse based on a signal detected by a first sensor arranged around the user, a signal processing unit that performs predetermined signal processing on signals detected by the first sensor and a second sensor arranged around the target, an output control unit that causes the signal detected by at least the second sensor and processed by the signal processing unit to be output to a first output unit arranged around the user, and a recognizing unit that recognizes, when a plurality of the targets are identified by the identifying unit, a selection request for selecting a specific target from among the plurality of targets based on the signal detected by the first sensor.

18 Claims, 22 Drawing Sheets

FIG. 5
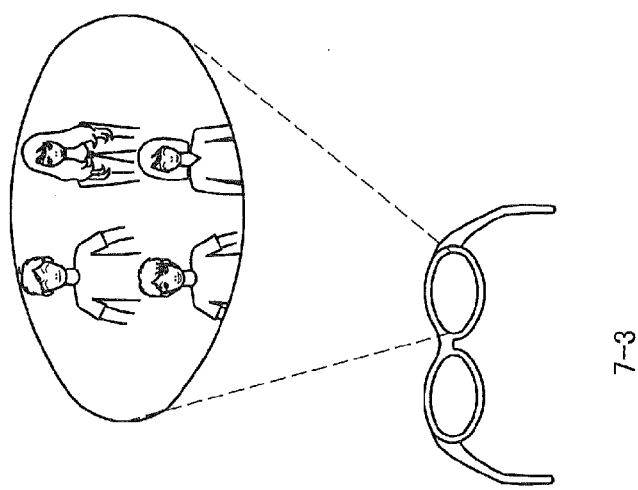
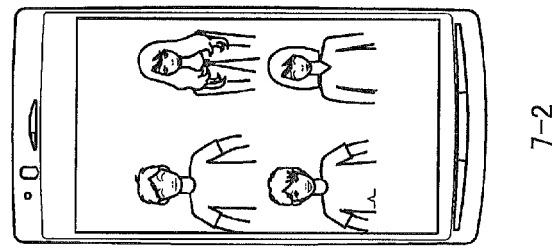
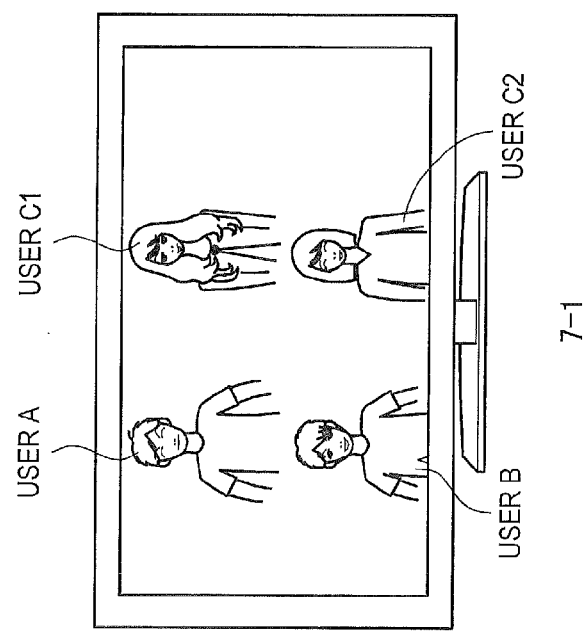

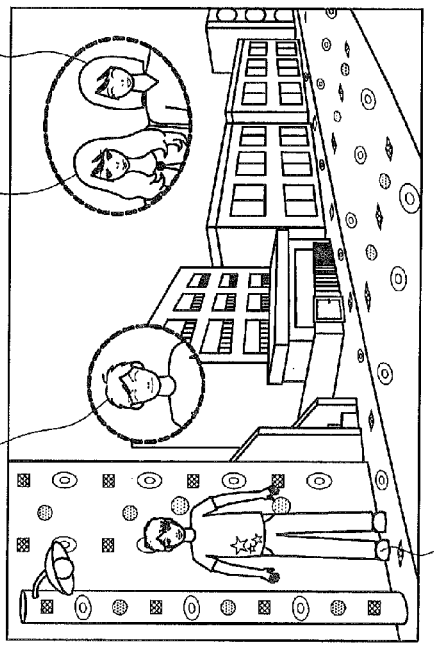
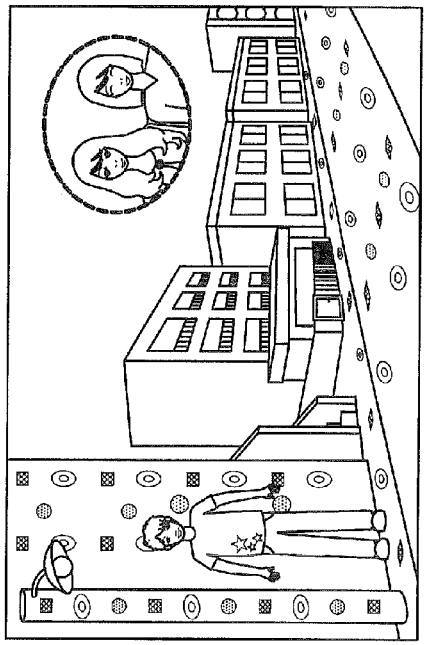
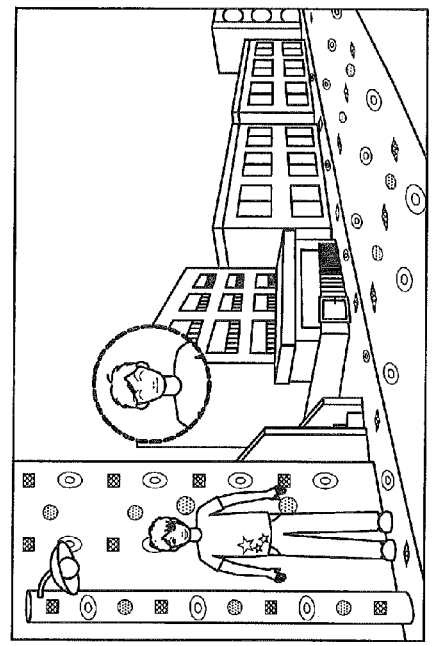
FIG. 14

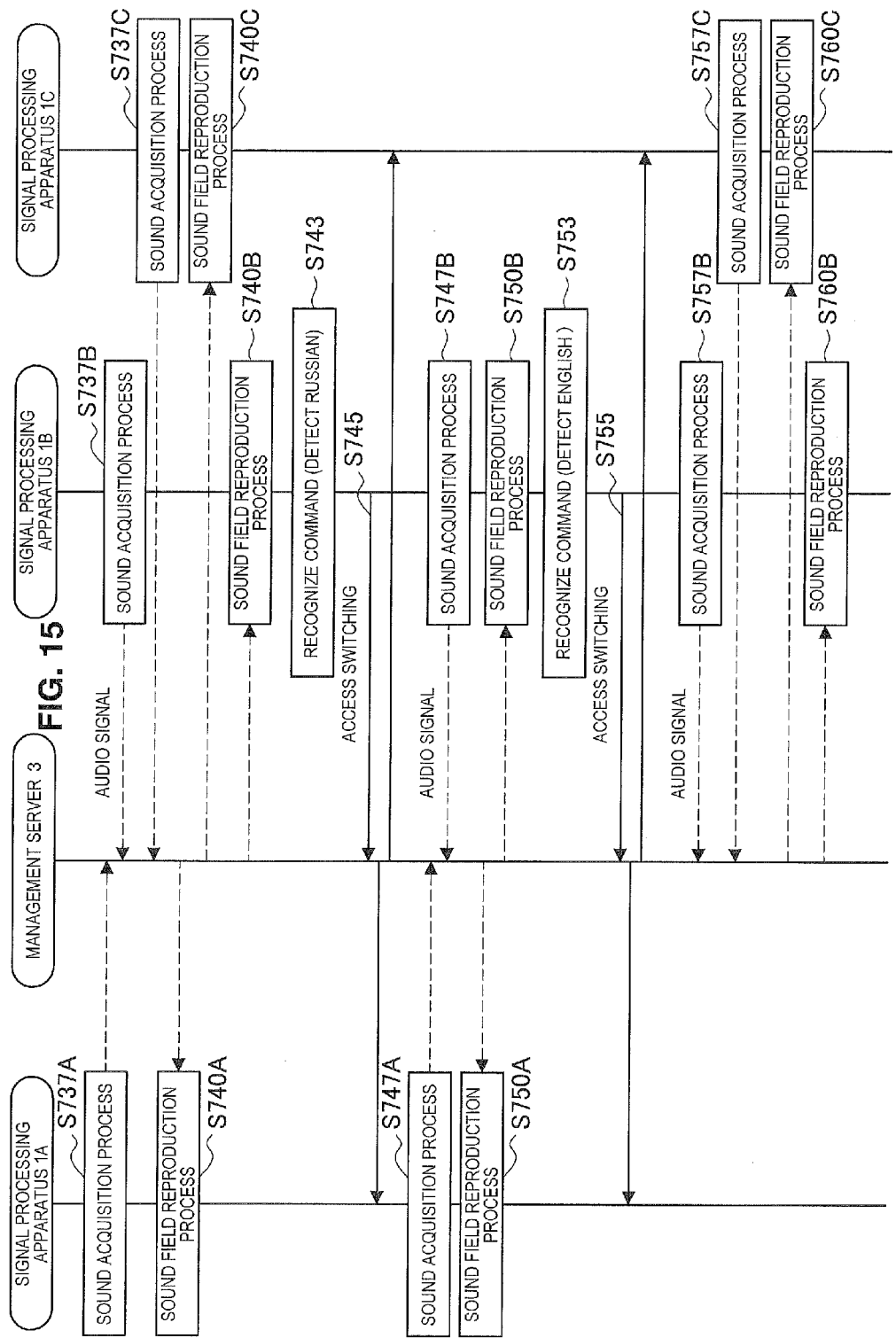

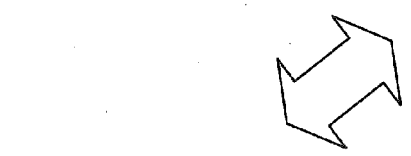
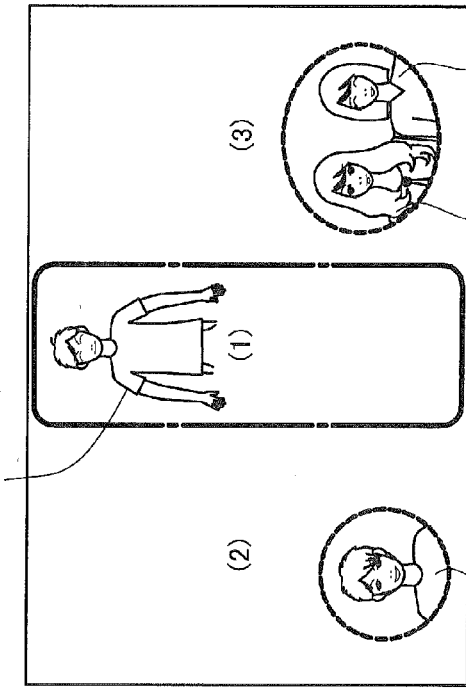
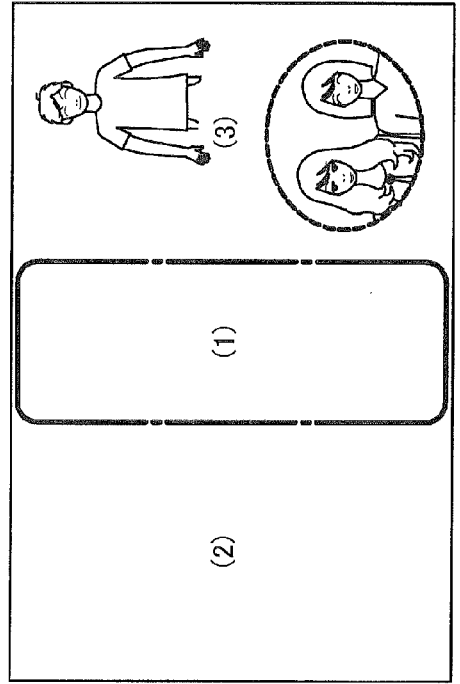
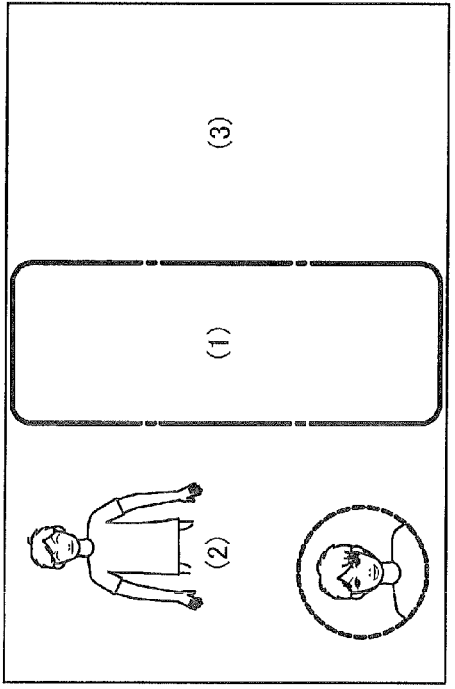

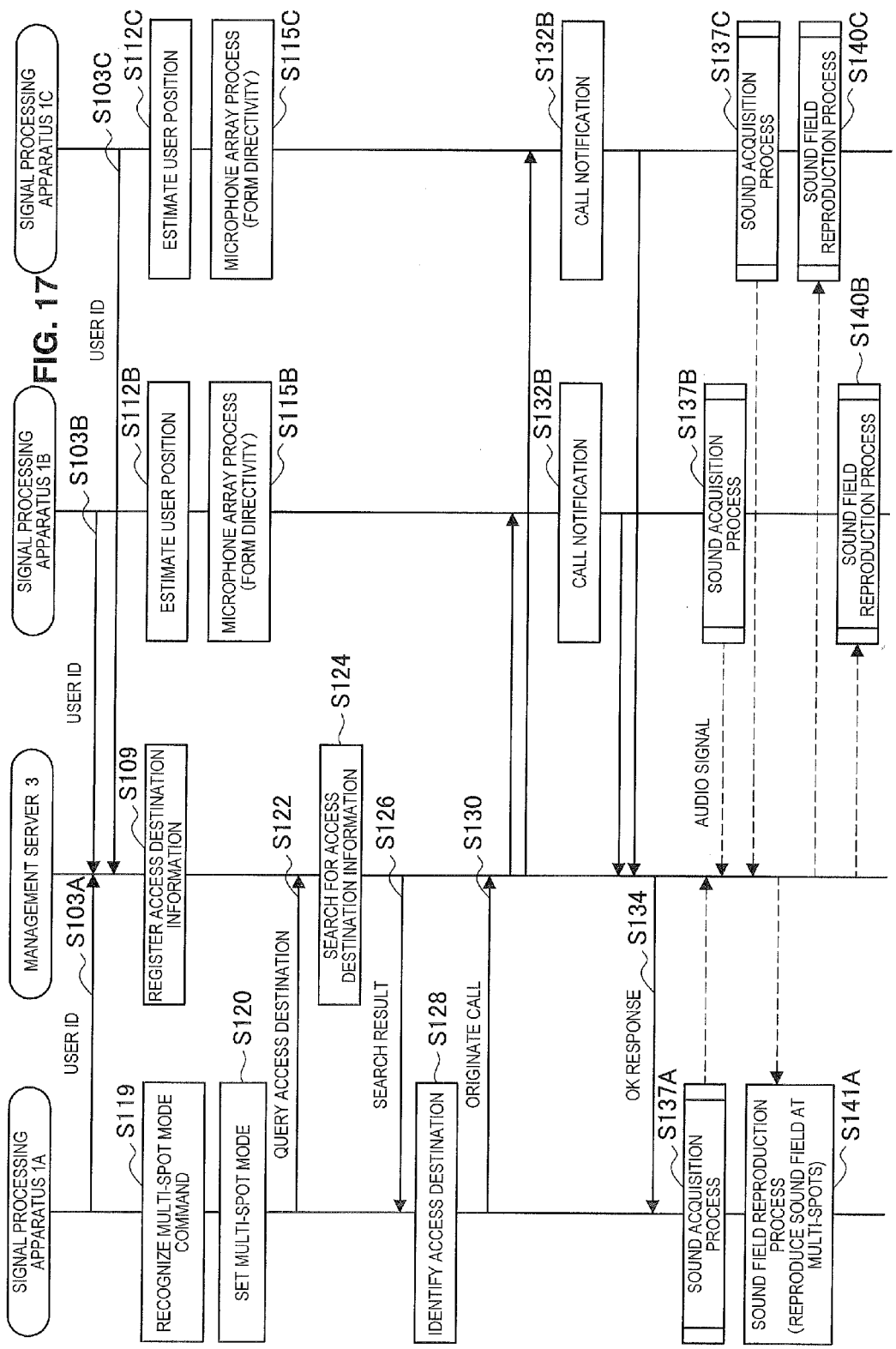

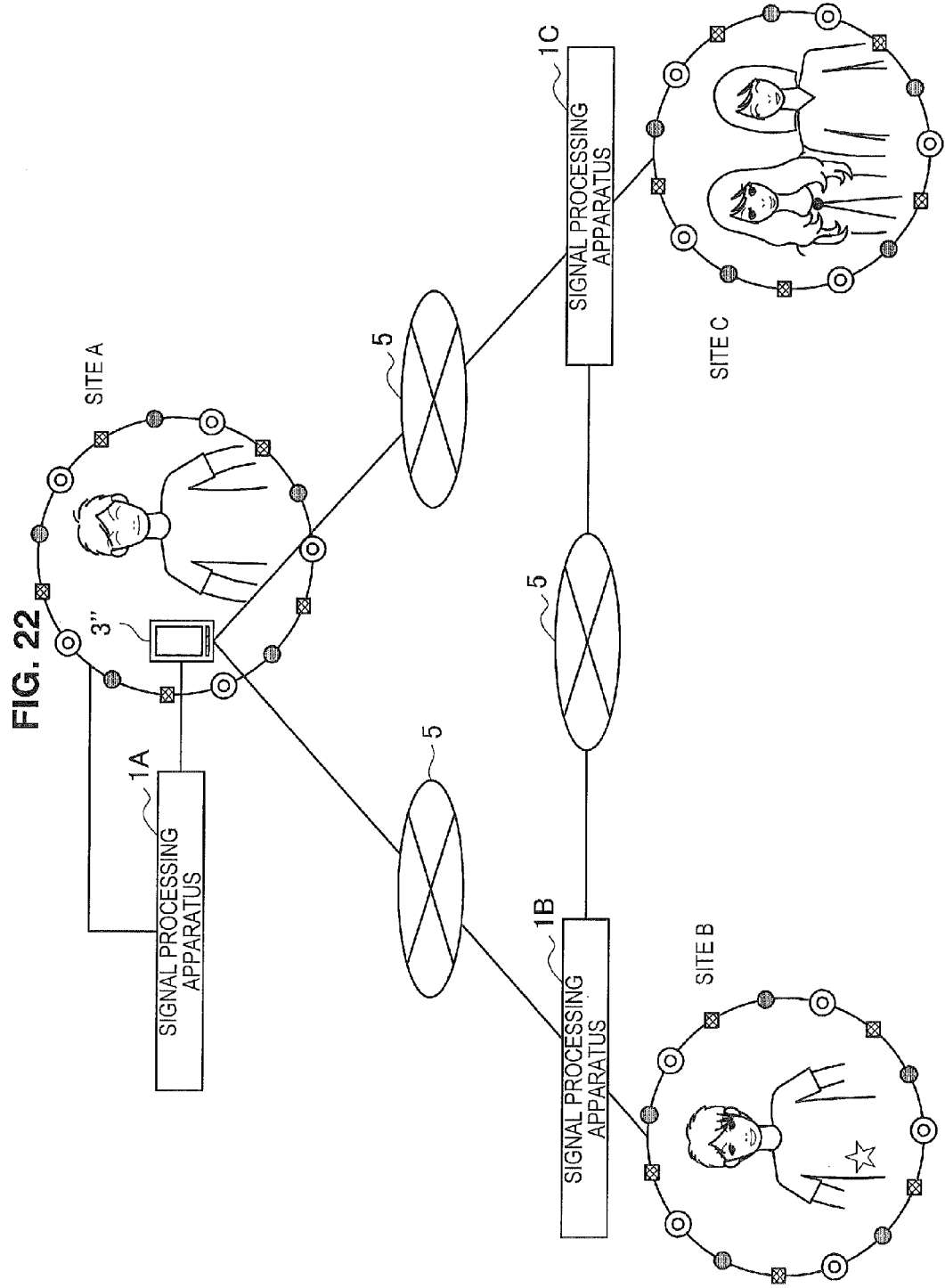

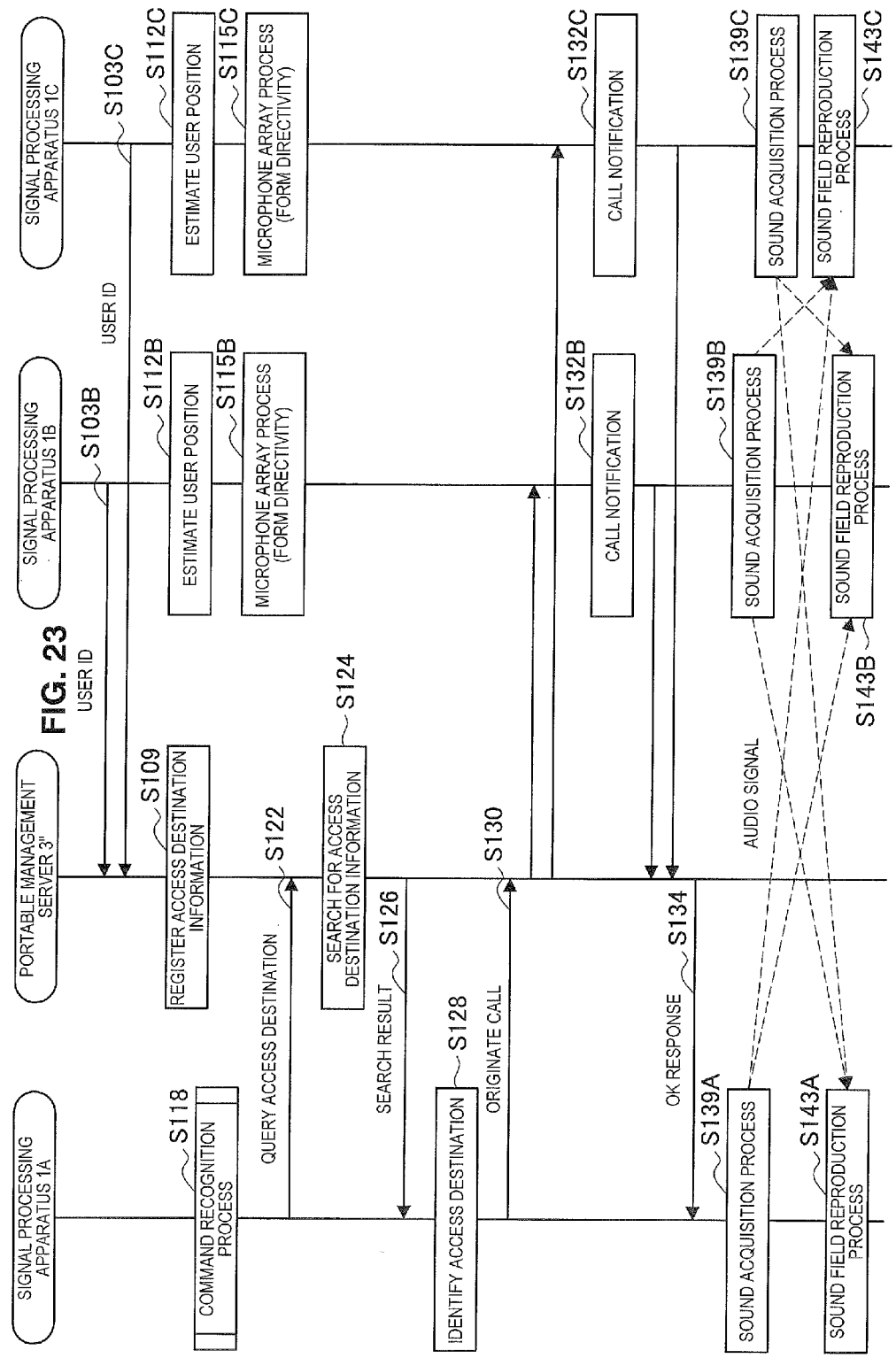

INFORMATION PROCESSING SYSTEM AND STORAGE MEDIUM

BACKGROUND

The present disclosure relates to an information processing system and a storage medium.

In recent years, various techniques have been proposed in data communication fields. Particularly, for example, various teleconference system techniques for smoothly performing teleconferencing have been proposed as data communication techniques used when a plurality of people converse.

For example, a technique in which a voice output is positioned at a different position for each speaker in a teleconference system in which a plurality of people converse, and thus a listener can easily determine a speaker has been disclosed in JP H2-295269A. Further, a technique of a video conference system in which a conference group is registered in advance, an intention to participate in a conference is transferred via a mail or the like in advance, and in this state, a participant is automatically allowed to participate in a conference upon entering a conference room has been disclosed in JP 2004-343178A.

SUMMARY

However, in JP H2-295269A and JP 2004-343178A, no technique for selecting an addressee from a plurality of interlocutors is mentioned.

It is desirable to provide an information processing system and a storage medium, which are novel and improved and enable an addressee to be selected from a plurality of interlocutors.

According to an embodiment of the present disclosure, there is provided an information processing system, including an identifying unit that identifies a user and a target with whom the user requests to converse based on a signal detected by a first sensor arranged around the user, a signal processing unit that performs predetermined signal processing on signals detected by the first sensor and a second sensor arranged around the target, an output control unit that causes the signal detected by at least the second sensor and processed by the signal processing unit to be output to a first output unit arranged around the user, and a recognizing unit that recognizes, when a plurality of the targets are identified by the identifying unit, a selection request for selecting a specific target from among the plurality of targets based on the signal detected by the first sensor. The output control unit causes the signal detected by the first sensor and processed by the signal processing unit to be output to a second output unit arranged around the specific target when the selection request is recognized by the recognizing unit.

According to an embodiment of the present disclosure, there is provided a non-transitory computer-readable storage medium having a program stored therein, for causing a computer to execute identifying a user and a target with whom the user requests to converse based on a signal detected by a first sensor arranged around the user, performing predetermined signal processing on signals detected by the first sensor and a second sensor arranged around the target, and causing the signal which has been detected by at least the second sensor and subjected to the signal processing to be output to a first output unit arranged around the user, and when a plurality of the targets are identified, performing a synthesis process on the signal detected by the second sensor arranged around the plurality of targets, recognizing a selection request for selecting a specific target from among the plurality of targets based on the signal detected by the first sensor, and causing the signal which has been detected by the first sensor and subjected to the signal processing to be output to a second output unit arranged around the specific target.

According to the embodiments of the present technology described above, it is possible to select an addressee from a plurality of interlocutors.

BRIEF DESCRIPTION OF THE DRAWINGS

FIG. 5 is an explanatory diagram illustrating an exemplary external appearance of a display device according to the present embodiment;

FIG. 14 is an explanatory diagram illustrating an exemplary outline of an access space selection process according to the present embodiment;

FIG. 15 is a flowchart illustrating an exemplary access space selection process according to the present embodiment;

FIG. 16 is an explanatory diagram illustrating an exemplary outline of an access space selection process according to the present embodiment;

FIG. 17 is a flowchart illustrating an exemplary multi-space access operation according to the present embodiment;

FIG. 22 is a diagram illustrating an exemplary overall configuration of the acoustic system according to the present embodiment; and FIG. 23 is a flowchart illustrating an exemplary multi-space access operation according to the present embodiment.

DETAILED DESCRIPTION OF THE EMBODIMENT(S)

Figure 1:
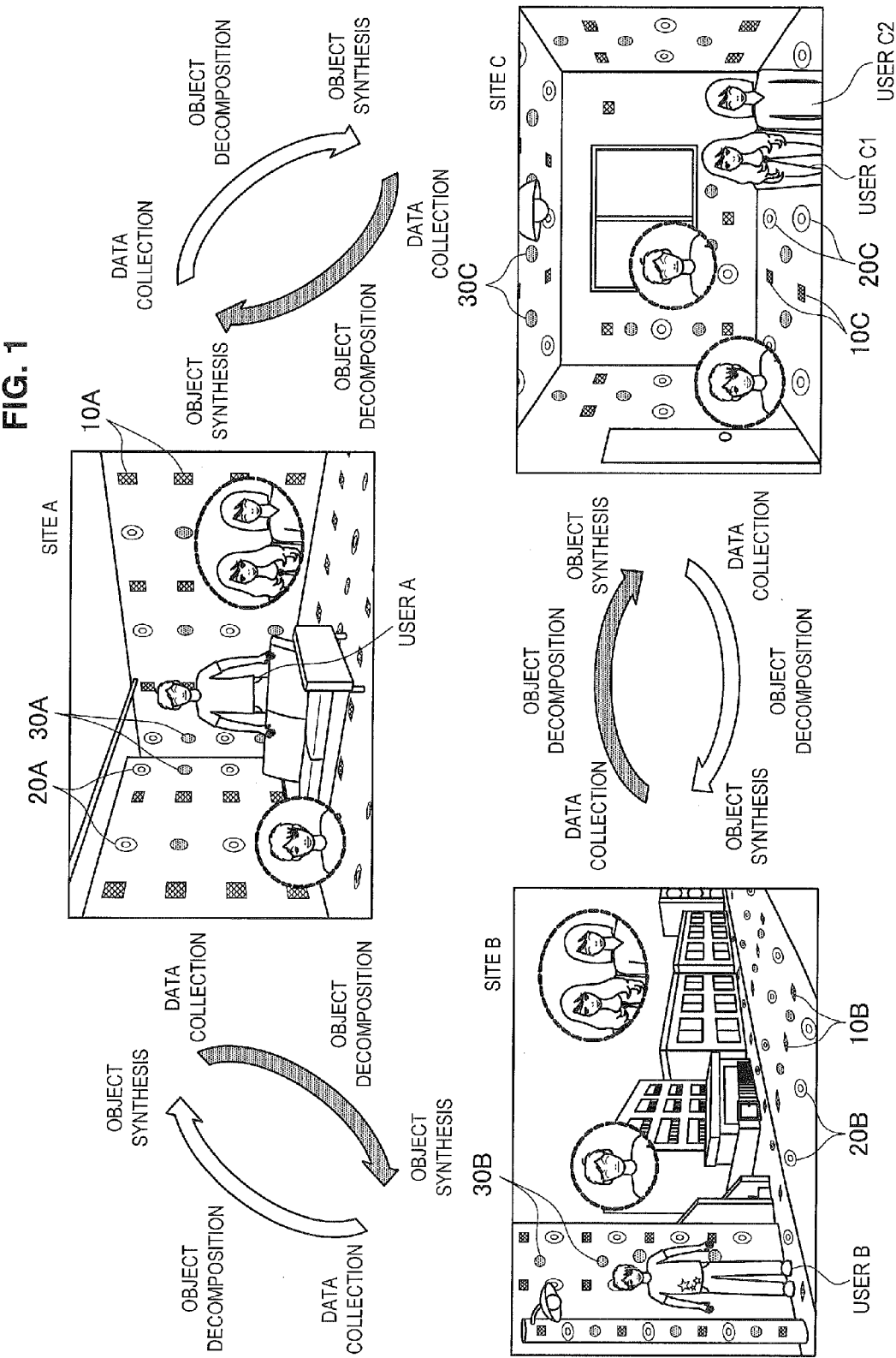
FIG. 1 is a diagram for describing an outline of an acoustic system according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will proceed in the following order:
1. Outline of acoustic system according to embodiment of present disclosure
2. Basic configuration
   2-1. System configuration
   2-2. Signal processing apparatus
   2-3. Management server
   2-4. Display device
3. Multi-space access process
   3-1. Basic process
   3-2. Command recognition process
   3-3. Sound acquisition process
   3-4. Sound field reproduction process
4. Access space selection process
   4-1. First access space selection process
   4-2. Second access space selection process
   4-3. Third access space selection process
   4-4. Fourth access space selection process
   4-5. Fifth access space selection process
   4-6. Sixth access space selection process
   4-7. Seventh access space selection process
   4-8. Process associated with access space selection process
5. Modified example of system configuration
   5-1. First exemplary system configuration
   5-2. Second exemplary system configuration
6. Effects
7. Conclusion <1. Outline of Acoustic System According to Embodiment of Present Disclosure>

An acoustic system (information processing system) according to an embodiment of the present disclosure includes:

A. an identifying unit (133) that identifies a user and a target with whom the user wishes to converse based on a signal detected by a first sensor (a microphone 10, a camera 30, or an IR thermal sensor 40) arranged around the user;

B. a signal processing unit (15) that performs predetermined signal processing on signals detected by the first sensor and a second sensor (a microphone 10, a camera 30, or an IR thermal sensor 40) arranged around the target;

C. an output control unit (17) that causes the signal, which is detected by at least the second sensor, and processed by the signal processing unit to be output to a first output unit (a speaker 20) arranged around the user; and D. a recognizing unit (131) that recognizes a selection request for selecting a specific target from among a plurality of targets based on the signal detected by the first sensor when the plurality of targets are identified by the identifying unit, E. wherein the output control unit causes the signal, which is detected by the first sensor and processed by the signal processing unit, to be output to a second output unit (a speaker 20) arranged around the specific target when the selection request is recognized by the recognizing unit.

First of all, an outline of an acoustic system according to the present embodiment will be described with reference to FIG. 1.

FIG. 1 is a diagram for describing an outline of the acoustic system according to the present embodiment. As illustrated in FIG. 1, the acoustic system is based on the assumption that a large number of sensors and actuators are arranged around the world such as in rooms, houses, building, outdoors, in different regions and countries and in mobile objects such as bicycles, motorcycles, vehicles, ships, helicopters, airplanes, and rockets. Examples of the sensor include a microphone 10, a camera 30, and a human sensor (for example, an IR thermal sensor 40 which will be described later in FIG. 3). Examples of the actuator include a speaker 20 and a display (not shown). In FIG. 1, among the microphones 10, the microphones 10 arranged at a "site A," a "site B," and a "site C," which are different places, are referred to as a "microphone 10A," a "microphone 10B," and a "microphone 10C." The above notation is applied similarly to the speaker 20 and the camera 30.

In the example illustrated in FIG. 1, a plurality of microphones 10A, a plurality of speakers 20A, and a plurality of cameras 30A are arranged on a wall, a floor, and a ceiling, or the like in the "site A" which is an indoor area in which a user A is currently located. Further, a plurality of microphones 10B, a plurality of speakers 20B, and a plurality of cameras 30B are arranged on a road or the like in the "site B" which is an outdoor area in which a user B is currently located. Further, a plurality of microphones 10C, a plurality of speakers 20C, and a plurality of cameras 30C are arranged in the "site C" which is an indoor area in which users C1 and C2 are currently located, similarly to the site A.

Here, the site A, the site B, and the site C can be connected to one another via a network. Further, signals detected by the sensors arranged in each site are transmitted to the other sites, and output through the actuators in each site. The following description will proceed with an example in which a voice acquired by the microphone 10 is output through the speaker 20, but a video detected by the camera 30 may be output through a display.

Thus, a plurality of speakers 20 or displays arranged around the user can reproduce another user's voice or video in real time. In this way, the user can converse with another user located in another space as if the users were conversing in the same place. Further, there is no restriction to the number of people with whom the user can converse, and a plurality of users located in different spaces can converse as if they were gathered at the same place and conversing.

Further, since the sensors and the actuators are arranged everywhere, it is unnecessary for the users to carry smart phones or mobile phone terminals. Thus, the user can make various inputs to the acoustic system using a voice or a gesture. Further, the acoustic system recognizes an input made by the user as a command representing the user's request.

There are various kinds of commands, and for example, there are a call origination request requesting access, that is, call origination to a space in which another user is located, a selection request for selecting a desired space from accessed spaces, and a selection release request for releasing selection of a space made by the selection request. The user can connect a space around the user with a space around another user by designating another user in the call origination request. Further, the user can privately converse with only another specified user by designating the other desired user from among a plurality of interlocutors in the selection request. Further, the user can end the private conversation and return to an original conversation with a plurality of people by making the selection release request. In the following, another user who is a target with whom the user requests to converse through the call origination request and another user which is a specific target selected in the selection request are referred to as a "target user."

Further, in the acoustic system, the user may carry a device used to allow the user to manage or recognize a conversation status such as a person with whom the user is currently conversing or a person with whom the user is currently privately conversing.

Hereinafter, a multi-space access operation based on the call origination request and an access space selection operation based on the selection request will be described in order in connection with an example in which the user A located at the site A converses with the user B located at the site B and the users C1 and C2 located at the site C.

(Multi-space Access)
Data Collection

At the site A, a data collection process is continuously performed through the plurality of microphones 10A, the plurality of cameras 30A, the plurality of human sensors, and the like. Specifically, the acoustic system collects voices acquired by the microphones 10A, photographed images photographed by the cameras 30A, or detection results of the human sensors, and estimates the user's position based on the collected information.

Further, the acoustic system may select a microphone group (the microphones 10A) arranged at the position at which the user's voice can be sufficiently acquired based on position information of the plurality of microphones 10 which are registered in advance and the user's estimated position. Further, the acoustic system performs a microphone array process of a stream group of an audio signal acquired by the selected microphones 10A. Particularly, the acoustic system may perform a delay-and-sum array in which a sound acquisition point is focused on the user A's mouth and can form super directivity of an array microphone. Thus, faint vocalizations such as the user A's muttering can be also acquired.

Further, the acoustic system recognizes a command based on the user A's acquired voice, and executes an operation process according to the command. For example, when the user A located at the site A says "I'd like to speak with B," the "call origination request to the user B" is recognized as a command. In this case, the acoustic system identifies the current position of the user B, and causes the site B in which the user B is currently located to be connected with the site A in which the user A is currently located. Through this operation, the user A can converse with the user B.

Further, a command may be recognized by the camera 30A, the human sensor, or the like.

At this time, the acoustic system may select an optimal camera 30A for recognizing a command, for example, the camera 30A positioned in front of the user based on position information of the plurality of cameras 30 which are registered in advance and the user's estimated position.

Object Decomposition

An object decomposition process such as sound source separation (separation of a noise component around the user A, a conversation of a person around the user A, and the like), dereverberation, and a noise/echo process is performed on an audio signal (stream data) acquired by the plurality of microphones 10A at the site A during a conversation. Through this process, stream data in which an S/N ratio is high and a reverberant feeling is suppressed is transmitted to the site B.

Considering a case in which the user A speaks while moving, the acoustic system can cope with this case by continuously performing the data collection. Specifically, the acoustic system continuously performs data collection based on the plurality of microphones 10, the plurality of cameras 30, the plurality of human sensors, and the like, and detects a moving path of the user A or a direction in which the user A is heading. Then, the acoustic system continuously updates selection of an appropriate microphone group (the microphones 10A) arranged around the moving user A, and continuously performs the microphone array process so that the sound acquisition point is constantly focused on the moving user A's mouth. Through this operation, the acoustic system can cope with a case in which the user A speaks while moving.

Further, separately from stream data of a voice, a moving direction of the user A or the like is converted into metadata and transmitted to the site B together with the stream data.

(Object Synthesis)

Further, the stream data transmitted to the site B is played back through the speaker 20B arranged around the user B located at the site B. At this time, the acoustic system performs data collection at the site B through the plurality of microphones 10B, the plurality of cameras 30B, and the plurality of human sensors, estimates the user B's position based on the collected data, and selects an appropriate speaker group (the speakers 20B) surrounding the user B through an acoustically closed surface. The stream data transmitted to the site B is played back through the selected speakers 20B, and an area inside the acoustically closed surface is controlled as an appropriate sound field. In this disclosure, a surface formed such that positions of a plurality of adjacent speakers 20, a plurality of adjacent microphones 10, or a plurality of adjacent cameras 30 are connected to surround the user is referred to conceptually as an "acoustically closed surface." Further, the "acoustically closed surface" does not necessarily configure a perfect closed surface, and is preferably configured to approximately surround the user.

Further, the acoustic system may control the user A's audio image using the plurality of speakers 20B arranged around the user B at the site B. In other words, the acoustic system may reconstruct the user A's voice (audio image) in the user B's ear or outside the acoustically closed surface by forming an array speaker (beam forming). Further, the acoustic system may cause the user A's audio image to move around the user B according to the user A's actual movement at the site B using metadata of the moving path or the direction of the user A.

The outline of voice communication from the site A to the site B has been described above in connection with respective steps of the data collection process, the object decomposition process, and the object synthesis process, but of course, a similar process is performed in voice communication from the site B to the site A. Thus, two-way voice communication can be performed between the site A and the site B. This is similarly applied to voice communication between the site A and the site C and voice communication between the site B and the site C.

(Selection of Access Space)

The acoustic system recognizes the selection request based on the user A's acquired voice, the photographed image which has been photographed, or the detection result of the human sensor. The acoustic system recognizes the selection release request in a similar manner. For example, when the user A designates the user B during a conversation among the users A, B, C1, and C2, the "selection request for the user B by the user A" is recognized as a command. In this case, the acoustic system plays back the user A's voice only for the user B. Then, when the selection release request by the user A is recognized, the acoustic system plays back the user A's voice for the users B, C1, and C2. As described above, the user A can privately converse with the user B.

Further, the acoustic system may recognize selection of a certain user among a plurality of users located in another space as the selection request. For example, when the user A designates the user C1 during a conversation among the users A, B, C1, and C2 the "selection request for the user C1 by the user A" is recognized as a command. In this case, the acoustic system plays back the user A's voice only for the user C1 at the site C. At this time, the user A's voice is not played back for the user C2 located at the same site, that is, the site C. As described above, the user A can privately converse with the user C1.

Further, the acoustic system may recognize selection of a certain user among a plurality of users located in the same space as the selection request. For example, when the user C1 designates a user C3 (not shown) located at the site C, the "selection request of the user C3 by the user C1" is recognized as a command. In this case, the acoustic system plays back the user C1's voice only for the user C3. At this time, the user C1's voice is not played back for the user C2 located at the same site, that is, the site C Thus, for example, when the user C1 utters vocalizations not to be heard by the user C2, only the user C3 can hear the user C1's voice. As described above, the user C1 can privately converse with the user C3.

The outline of the acoustic system according to an embodiment of the present disclosure has been described above. Next, a configuration of the acoustic system will be described in detail with reference to FIGS. 2 to 7.

<2. Basic Configuration>

[2-1. System Configuration]

Figure 2:
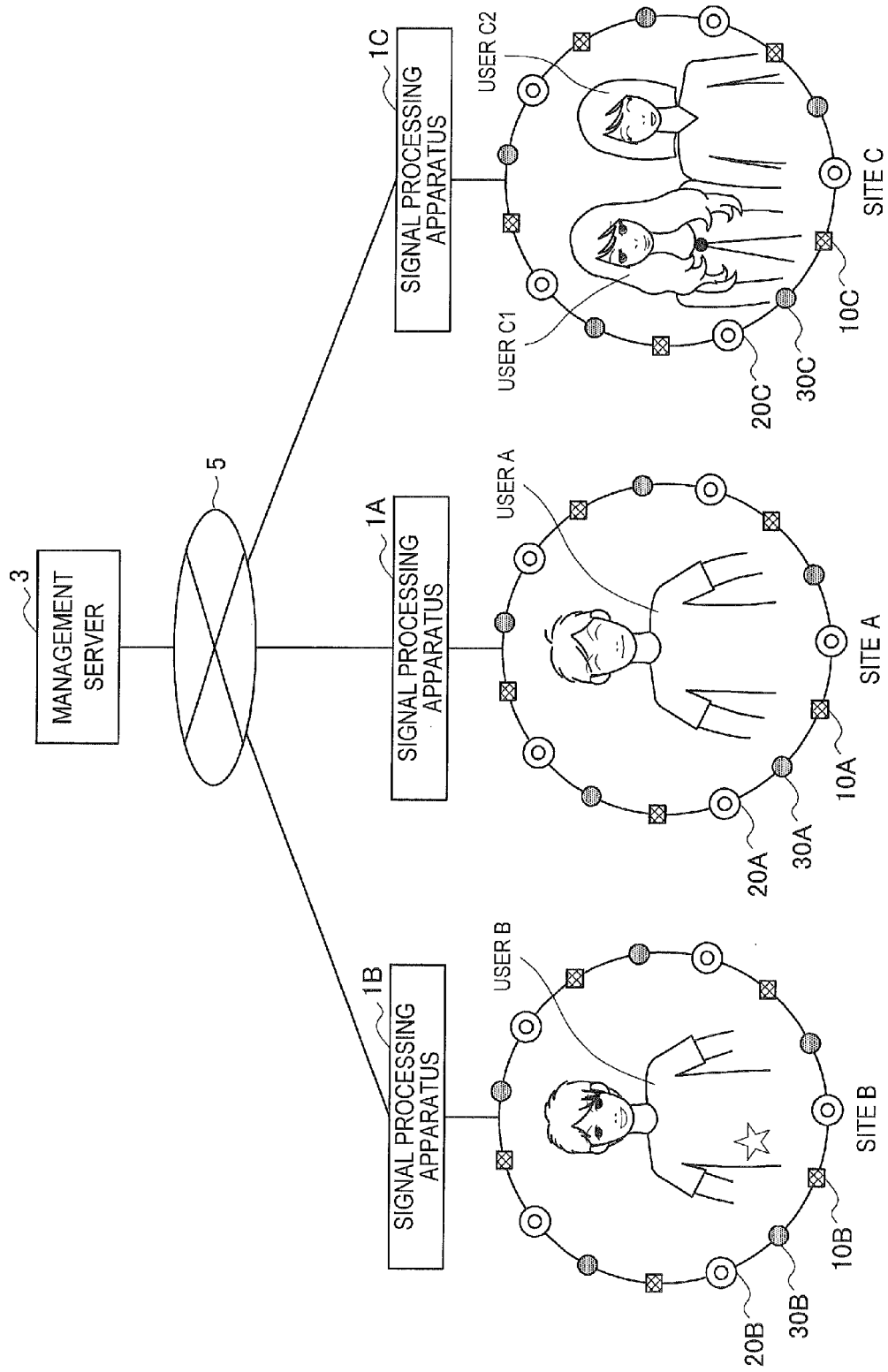
FIG. 2 is a diagram illustrating an overall configuration of the acoustic system according to the present embodiment.

FIG. 2 is a diagram illustrating an overall configuration of the acoustic system according to the present embodiment. As illustrated in FIG. 2, the acoustic system is a client-server type system including signal processing apparatuses 1A, 1B, and 1C, the microphones 10A, 10B, and 10C, the speakers 20A, 20B, and 20C, the cameras 30A, 30B, and 30C, and a management server 3.

The signal processing apparatus 1A, the signal processing apparatus 1B, and the signal processing apparatus 1C are connected to a network 5 in a wired/wireless manner, and can transmit or receive data to or from one another via the network 5. The management server 3 is connected to the network 5, and the signal processing apparatus 1A, the signal processing apparatus 1B, and the signal processing apparatus 1C can transmit or receive data to or from the management server 3.

The signal processing apparatus 1A processes a signal input or output by the plurality of microphones 10A, the plurality of speakers 20A, and the plurality of cameras 30A arranged at the site A. The signal processing apparatus 1B processes a signal input or output by the plurality of microphones 10B, the plurality of speakers 20B, and the plurality of cameras 30B arranged at the site B. The signal processing apparatus 1C processes a signal input or output by the plurality of microphones 10C, the plurality of speakers 20C, and the plurality of cameras 30C arranged at the site C. Further, when it is unnecessary to distinguish the signal processing apparatuses 1A, 1B, and 1C from one another, the signal processing apparatuses 1A, 1B, and 1C are referred to collectively as a "signal processing apparatus 1."

The management server 3 has a function of performing a user authentication process and managing a user's absolute position (current position). Further, the management server 3 may manage information (for example, an IP address) representing a position of a place or a building. Thus, the signal processing apparatus 1 can send a query for access destination information (for example, an IP address) of a target user designated by the user to the management server 3 and acquire the access destination information. Further, the management server 3 may manage information about a user who is currently conversing or a user who is currently privately conversing among users in a conversation.

The signal processing apparatus 1 receives or outputs a signal from or to the microphone 10, the speaker 20, and the camera 30 arranged in a predetermined space. In other words, the management server 3 receives or outputs a signal from or to the microphone 10 and the speaker 20 arranged in a plurality of predetermined spaces through the signal processing apparatus 1. Further, the server-client type acoustic system connects the microphone 10 and the speaker 20 arranged in a space in which the user is located among a plurality of predetermined spaces with the microphone 10 and the speaker 20 arranged in a space in which the target user is located through the management server 3. Through this operation, the server-client type acoustic system implements multi-space access and access space selection through the management server 3.

[2-2. Signal Processing Apparatus]

Figure 3:
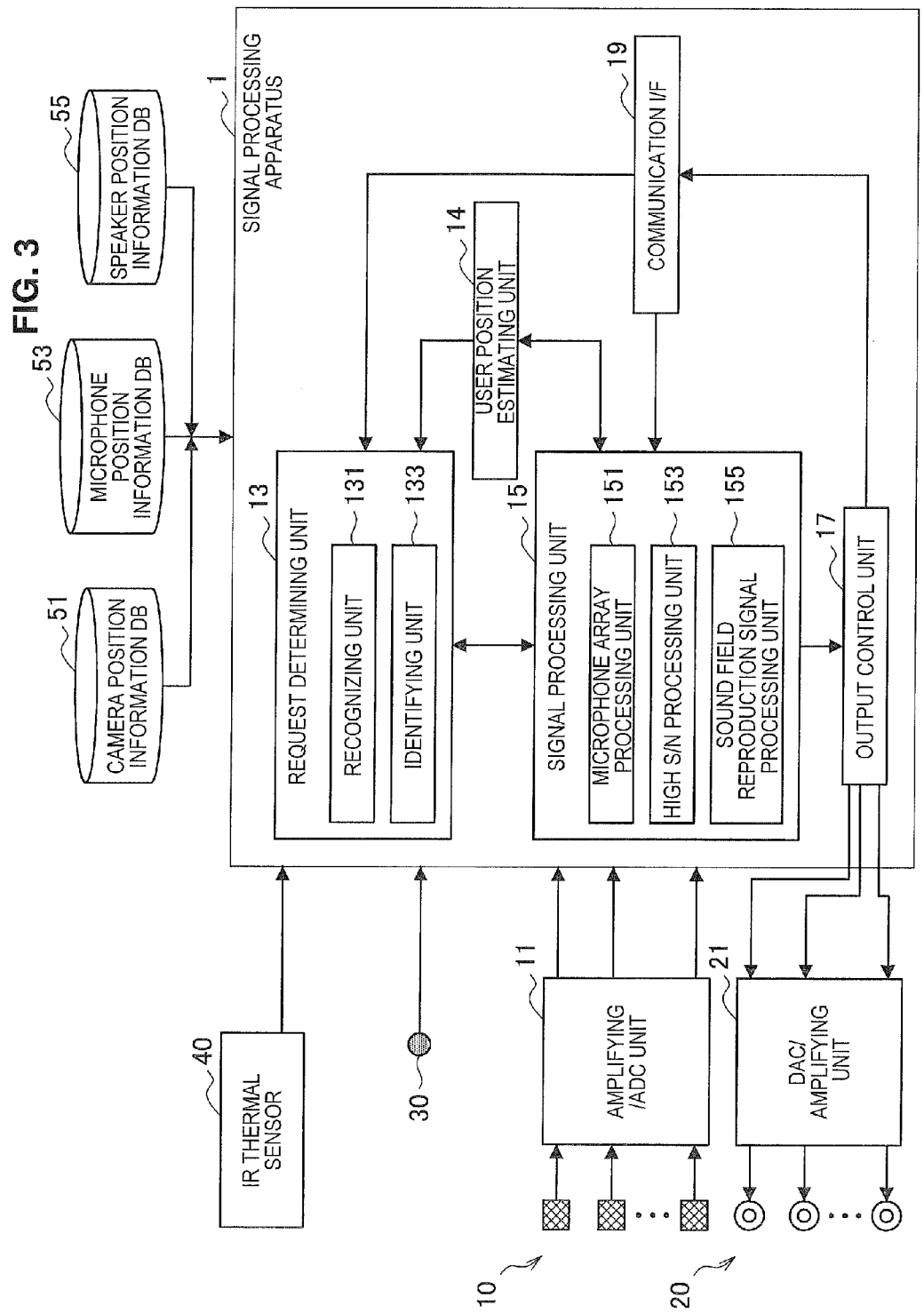
FIG. 3 is a block diagram illustrating a configuration of a signal processing apparatus according to the present embodiment.

Next, a configuration of the signal processing apparatus 1 will be described in detail. FIG. 3 is a block diagram illustrating a configuration of the signal processing apparatus 1 according to the present embodiment. As illustrated in FIG. 3, the signal processing apparatus 1 includes a request determining unit 13, a user position estimating unit 14, a signal processing unit 15, an output control unit 17, and a communication I/F 19. The signal processing apparatus 1 is connected to a plurality of microphones 10 (an array microphone) via an amplifying/analog-to-digital converter (ADC) unit 11, a plurality of speakers 20 (an array speaker) via a digital-to-analog converter (DAC)/amplifying unit 21, the camera 30, the IR thermal sensor 40, a camera position information database (DB) 51, a microphone position information DB 53, and a speaker position information DB 55. The above-mentioned components will be described below.

(Array Microphone)

The plurality of microphones 10 are arranged throughout a certain area (site) as described above. For example, the plurality of microphones 10 are arranged at outdoor sites such as roads, electric poles, street lamps, houses, and outer walls of buildings and indoor sites such as floors, walls, and ceilings. The plurality of microphones 10 acquire ambient sounds, and output the acquired ambient sounds to the amplifying/ADC unit 11.

(Amplifying/ADC Unit)

The amplifying/ADC unit 11 has a function (amplifier) of amplifying acoustic waves output from the plurality of microphones 10 and a function (ADC) of converting an acoustic wave (analog data) into an audio signal (digital data). The amplifying/ADC unit 11 outputs the converted audio signals to the signal processing apparatus 1.

(Microphone Position Information DB)

The microphone position information DB 53 is a storage unit that stores position information of the plurality of microphones 10 arranged at the site. The position information of the plurality of microphones 10 may be registered in advance.

(Camera and IR Thermal Sensor)

The cameras 30 and the IR thermal sensors 40 are arranged throughout a certain area (site) as described above. For example, the cameras 30 and the IR thermal sensors 40 are arranged at outdoor sites such as roads, electric poles, street lamps, houses, and outer walls of buildings and indoor sites such as floors, walls, and ceilings. The cameras 30 and the IR thermal sensors 40 photographs or senses the surroundings, and outputs the photographing or sensing result to the signal processing apparatus 1.

(Camera Position Information DB)

The camera position information DB 51 is a storage unit that stores position information of the plurality of cameras 30 arranged at the site. The position information of the plurality of cameras 30 may be registered in advance.

(User Position Estimating Unit)

The user position estimating unit 14 has a function of estimating the user's position. Specifically, the user position estimating unit 14 estimates the user's relative position to the plurality of microphones 10 or the plurality of speakers 20 based on the analysis result of the sounds acquired by the plurality of microphones 10, the analysis result of the photographed images photographed by the cameras 30, or the detection result obtained by the IR thermal sensors 40. The user position estimating unit 14 may acquires Global Positioning System (GPS) information and estimate the user's absolute position (current position information).

(Request Determining Unit)

The request determining unit 13 has a function of recognizing the user's request based on the output results by the microphone 10, the camera 30, and the IR thermal sensor 40. More specifically, the request determining unit 13 functions as a recognizing unit 131 and an identifying unit 133.

(Recognizing Unit)

The recognizing unit 131 analyzes the user's voice based on the audio signals which are acquired by the plurality of microphones 10 and then processed by the signal processing unit 15, and recognizes various kinds of commands such as the call origination request, the selection request, and the selection release request. In addition, the recognizing unit 131 may detect the user's motion (gesture) based on images acquired by the plurality of cameras 30 and the detection results acquired by the IR thermal sensors 40, analyze the detected gesture, and recognize a command.

Further, the recognizing unit 131 may recognize a command using an output from an appropriate camera for recognizing a command, for example, an output from the camera 30 positioned in front of the user based on the positions of the cameras 30 registered to the camera position information DB 51. Similarly, the recognizing unit 131 may recognize the user's request using an output from an optimal IR thermal sensor 40 for recognizing a command based on the positions of the IR thermal sensors 40 registered to an IR thermal sensor position information DB (not shown).

Further, the recognizing unit 131 that has recognized the selection request generates selection target setting information representing the user who has uttered the selection request and the selected target user, and outputs the selection target setting information to the signal processing unit 15. Here, the users represented by the selection target setting information are meant as the participants in a private conversation. For example, the user A designates the user B during a conversation with the users B, C1, and C2, the recognizing unit 131 recognizes the "selection request for the user B by the user A," and outputs the selection target setting information representing the "users A and B" to the signal processing unit 15.

Further, the recognizing unit 131 that has recognized the selection release request outputs the selection target setting information representing the target user selected by the selection request and the non-selected target user to the signal processing unit 15. For example, when the user A privately converses with the user B during a conversation with the users B, C1, and C2, the recognizing unit 131 recognizes the selection release request, and outputs the selection target setting information representing the "users A, B, C1, and C2" to the signal processing unit 15.

(Identifying Unit)

The identifying unit 133 has a function of identifying the target user recognized by the recognizing unit 131. Specifically, for example, the identifying unit 133 may decide the access destination information for acquiring a voice and an image corresponding to a target user designated by a command. For example, the identifying unit 133 may transmit information representing the target user to the management server 3 through the communication I/F 19, and acquire the access destination information (for example, an IP address) corresponding to the target user from the management server 3.

(Communication I/F)

The communication I/F 19 is a communication module for transmitting or receiving data to or from another signal processing apparatus or the management server 3 via the network 5. For example, the communication I/F 19 sends a query for access destination information corresponding to the target user identified by the identifying unit 133 to the management server 3. In addition, the communication I/F 19 transmits the selection target setting information output from the output control unit 17 and the audio signal which is acquired by the microphone 10 and then processed by the signal processing unit 15 to another signal processing apparatus 1 which is an access destination. Alternatively, the communication I/F 19 receives the audio signal of the target user and the selection target setting information from another signal processing apparatus 1 which is an access destination, and outputs the audio signal and the selection target setting information to the signal processing unit 15.

(Signal Processing Unit)

The signal processing unit 15 processes the audio signals output from the amplifying/ADC unit 11, the audio signal from the target user received by the communication I/F 19, and the audio signals to be played back by the speaker 20 through the DAC/amplifying unit 21. Further, the signal processing unit 15 outputs the selection target setting information output from the recognizing unit 131 to the output control unit 17. Here, the signal processing unit 15 functions as a microphone array processing unit 151, a high S/N processing unit 153, and a sound field reproduction signal processing unit 155.

(Microphone Array Processing Unit)

The microphone array processing unit 151 performs directivity control such that the user's voice is focused on (a sound acquisition position is focused on the user's mouth) in the microphone array process for a plurality of audio signals output from the amplifying/ADC unit 11.

At this time, the microphone array processing unit 151 may select a microphone group forming the acoustically closed surface surrounding the user which is optimal for acquisition of the user's voice based on the user's position estimated by the user position estimating unit 14 or the positions of the microphones 10 registered to the microphone position information DB 53. Then, the microphone array processing unit 151 performs directivity control on the audio signals acquired by the selected microphone group. Further, the microphone array processing unit 151 may form super directivity of the array microphone through a delay-and-sum array process and a null generation process.

(High S/N Processing Unit 153)

The high S/N processing unit 153 has a function of processing a plurality of audio signals output from the amplifying/ADC unit 11 to form a monaural signal having high articulation and a high S/N ratio. Specifically, the high S/N processing unit 153 performs sound source separation, and performs dereverberation and noise reduction.

Further, the high S/N processing unit 153 may be disposed at a stage subsequent to the microphone array processing unit 151. Further, the audio signals (stream data) processed by the high S/N processing unit 153 are output to the sound field reproduction signal processing unit 155, the request determining unit 13, and the output control unit 17.

(Sound Field Reproduction Signal Processing Unit)

The sound field reproduction signal processing unit 155 performs signal processing on the audio signals to be played back through the plurality of speakers 20, and performs control such that a sound field is positioned at the user's position. Specifically, the sound field reproduction signal processing unit 155 selects an optimal speaker group for forming the acoustically closed surface surrounding the user based on the user's position estimated by the user position estimating unit 14 or the positions of the speakers 20 registered to the speaker position information DB 55. Then, the sound field reproduction signal processing unit 155 writes the audio signals which have been subjected to signal processing in output buffers of a plurality of channels corresponding to the selected speaker group.

At this time, when a plurality of target users are identified by the identifying unit 133, the sound field reproduction signal processing unit 155 may control the positions at which an audio image is positioned for a plurality of target users. Specifically, the sound field reproduction signal processing unit 155 may divide the speaker group selected to surround the user by the number of target users, and write the audio signals from the target users in output buffers of a plurality of channels corresponding to the divided speaker groups. In addition, the sound field reproduction signal processing unit 155 may perform a process of synthesizing audio signals from a plurality of target users, and write the synthesized audio signal in output buffers of a plurality of channels corresponding to the selected speaker group.

Here, when the selection target setting information is output from the recognizing unit 131, the sound field reproduction signal processing unit 155 selects an audio signal to be played back through the speaker 20 according to the selection target setting information Specifically, the sound field reproduction signal processing unit 155 writes only an audio signal from the target user represented by the selection target setting information among the audio signals from the target users received through the communication I/F 19 in the output buffer.

For example, the signal processing apparatus 1A corresponding to the site A will be described in connection with an example in which the user A located at the site A designates the user B during a conversation with the users B, C1, and C2. At this time, since the selection target setting information representing the "users A and B" is output from the recognizing unit 131, the sound field reproduction signal processing unit 155 writes only the audio signal from the user B in the output buffer.

Meanwhile, even when the selection target setting information is received from the target user through the communication I/F 19, the sound field reproduction signal processing unit 155 selects an audio signal to be played back through the speaker 20 according to the selection target setting information. Specifically, when the user corresponding to the signal processing apparatus 1 is included as the target user represented by the selection target setting information, the sound field reproduction signal processing unit 155 writes only the audio signal from the target user represented by the selection target setting information in the output buffer. However, when the user corresponding to the signal processing apparatus 1 is not included as the target user represented by the selection target setting information, the sound field reproduction signal processing unit 155 does not write the audio signal from the target user in the output buffer.

For example, the signal processing apparatus 1B corresponding to the site B will be described in connection with an example in which the user A located at the site A designates the user B during a conversation with the users B, C1, and C2. At this time, since the "users A and B" represented by the selection target setting information received through the communication I/F 19 include the user B corresponding to the signal processing apparatus 1B, the sound field reproduction signal processing unit 155 writes only the audio signal from the user A represented by the selection target setting information in the output buffer.

Next, the signal processing apparatus 1C corresponding to the site C will be described in connection with an example in which the user A located at the site A designates the user B during a conversation with the users B, C1, and C2. At this time, since the "users A and B" represented by the selection target setting information received through the communication I/F 19 do not include the users C1 and C2 corresponding to the signal processing apparatus 1C, the sound field reproduction signal processing unit 155 does not write the audio signals from the user A and B represented by the selection target setting information in the output buffer.

Lastly, the signal processing apparatus 1A corresponding to the site A when the user A makes the selection release request will be described in connection with an example in which the user A located at the site A designates the user B during a conversation with the users B, C1, and C2. At this time, since the selection target setting information representing the "users A, B, C1, and C2" is output from the recognizing unit 131, the sound field reproduction signal processing unit 155 writes the audio signals from the users B, C1, and C2 represented by the selection target setting information in the output buffer.

Further, the sound field reproduction signal processing unit 155 controls an area inside the acoustically closed surface as an appropriate sound field. As a method of controlling the sound field, for example, the Helmholtz-Kirchhoff integral theorem and the Rayleigh integral theorem are known, and wave field synthesis (WFS) based on the theorems is generally known. Further, the sound field reproduction signal processing unit 155 may apply signal processing techniques disclosed in JP 4674505 B and JP 4735108B.

(Output Control Unit)

The output control unit 17 controls the DAC/amplifying unit 21 and the speaker 20, and outputs the audio signal written in the output buffer by the sound field reproduction signal processing unit 155. Further, the output control unit 17 transmits the audio signal, which is acquired by the microphone 10, output from the high S/N processing unit 153 and the selection target setting information output from the recognizing unit 131 to another signal processing apparatus 1 through the communication I/F 19.

(Speaker Position Information DB)

The speaker position information DB 55 is a storage unit that stores position information of the plurality of speakers 20 arranged at the site. The position information of the plurality of speakers 20 may be registered in advance.

(DAC/Amplifying Unit)

The DAC/amplifying unit 21 has a function (DAC) of converting the audio signals (digital data), which are written in the output buffers of the channels, to be respectively played back through the plurality of speakers 20 into acoustic waves (analog data).

In addition, the DAC/amplifying unit 21 amplifies the converted acoustic waves, and plays back (outputs) the acoustic waves through the plurality of speakers 20.

(Array Speaker)

The plurality of speakers 20 are arranged throughout a certain area (site) as described above. For example, the plurality of speakers 20 are arranged at outdoor sites such as roads, electric poles, street lamps, houses, and outer walls of buildings and indoor sites such as floors, walls, and ceilings. Further, the plurality of speakers 20 reproduce the acoustic waves (voices) output from the DAC/amplifying unit 21.

(Supplement)

The configuration of the signal processing apparatus 1 has been described above in detail. Further, the signal processing apparatus 1 may function as an arithmetic processing device and a control device, and include a control unit that controls an overall operation of the signal processing apparatus 1 according to various kinds of programs and a storage unit that stores a program, arithmetic parameters, and the like used by the control unit. For example, the control unit is implemented by a central processing unit (CPU) or a microprocessor. Further, the storage unit is implemented by a read only memory (ROM), a random access memory (RAM), a magnetic disk, or an optical disc.

[2-3. Management Server]

Figure 4:
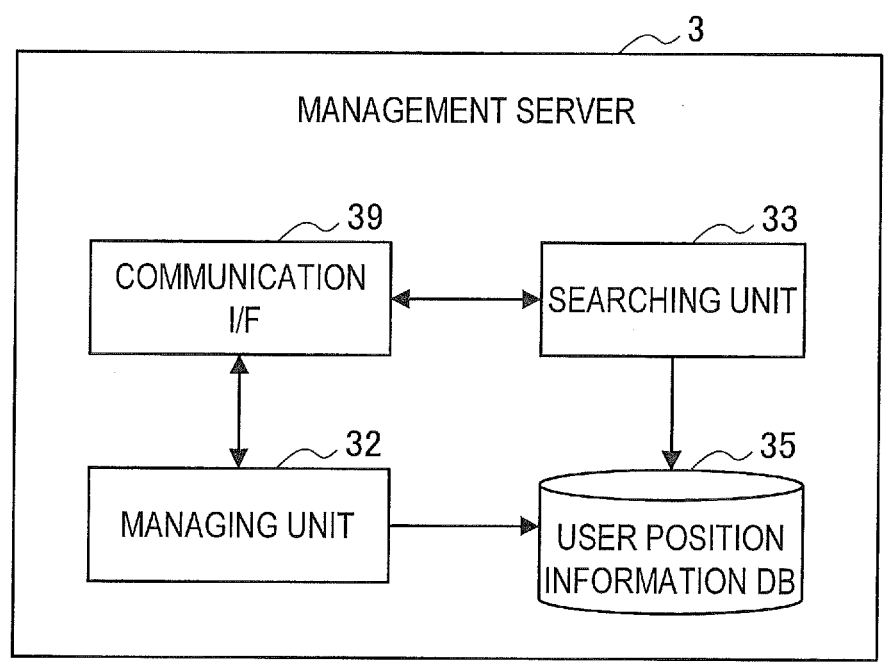
FIG. 4 is a block diagram illustrating a configuration of a management server according to the present embodiment.

Next, a configuration of the management server 3 will be described. FIG. 4 is a block diagram illustrating a configuration of the management server 3 according to the present embodiment. As illustrated in FIG. 4, the management server 3 includes a managing unit 32, a searching unit 33, a user position information DB 35, and a communication I/F 39. The above-mentioned components will be described below.

(Managing Unit)

The managing unit 32 manages information associated with a place (site) in which the user is currently located based on a user ID transmitted from the signal processing apparatus 1. For example, the managing unit 32 identifies the user based on the user ID, and stores an IP address of the signal processing apparatus 1 of a transmission source in the user position information DB 35 in association with a name of the identified user or the like as the access destination information. The user ID may include a name, a personal identification number, or biological information. Further, the managing unit 32 may perform the user authentication process based on the transmitted user ID.

(User Position Information DB)

The user position information DB 35 is a storage unit that stores information associated with a place at which the user is currently located according to management by the managing unit 32. Specifically, the user position information DB 35 stores the user ID and the access destination information (for example, an IP address of a signal processing apparatus corresponding to a site in which the user is located) in association with each other. Further, current position information of each user may be constantly updated.

(Searching Unit)

The searching unit 33 searches for the access destination information with reference to the user position information DB 35 according to the access destination (call origination destination) query from the signal processing apparatus 1. Specifically, the searching unit 33 searches for the associated access destination information and extracts the access destination information from the user position information DB 35 based on, for example, a name of a target user included in the access destination query.

(Communication I/F)

The communication I/F 39 is a communication module that transmits or receives data to or from the signal processing apparatus 1 via the network 5. For example, the communication I/F 39 receives the user ID and the access destination query from the signal processing apparatus 1. Further, the communication I/F 39 transmits the access destination information of the target user in response to the access destination query. Further, the communication I/F 39 relays transmission and reception of data such as the audio signal and the selection target setting information between a plurality of signal processing apparatuses 1.

(Supplement)

A configuration of the management server 3 has been described above in detail. Further, the management server 3 may function as an arithmetic processing device and a control device, and include a control unit that controls an overall operation of the management server 3 according to various kinds of programs and a storage unit that stores a program, arithmetic parameters, and the like used by the control unit.

Further, the management server 3 may have a function of the signal processing apparatus 1. In other words, the management server 3 may perform transmission and reception of a signal without involving the microphones 10, the speakers 20, the cameras 30, and the signal processing apparatus 1, and perform multi-space access and access space selection. Further, the management server 3 may have a part of the function of the signal processing apparatus 1 and implement the function of the signal processing apparatus 1 in collaboration with a signal processing apparatus having no corresponding function.

[2-4. Display Device]

Next, a display device that displays a current conversation status of the user will be described. The display device can display a conversation status such as a person with whom the user is currently conversing. Here, FIG. 5 illustrates an exemplary external appearance of the display device according to the present embodiment. As illustrated in FIG. 5, the display device 7 according to the present embodiment may be implemented in various forms such as a stationary display device 7-1, a smart phone 7-2, and a glasses-type display device 7-3. In addition, the display device 7 may be a device that projects the conversation status on a window glass such as a show window or a vehicle window arranged around the user. Next, a configuration of the display device 7 will be described with reference to FIG. 6.

Figure 6:
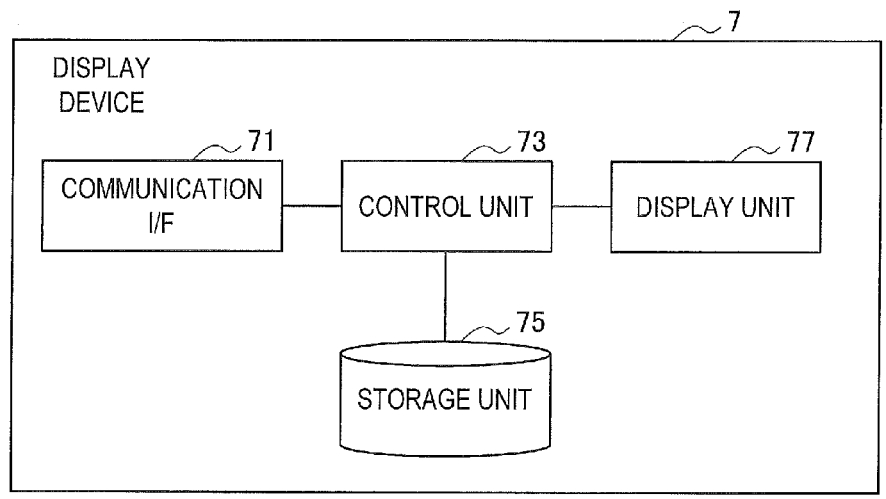
FIG. 6 is a block diagram illustrating an exemplary configuration of the display device according to the present embodiment.

FIG. 6 is a block diagram illustrating an exemplary configuration of the display device 7 according to the present embodiment. As illustrated in FIG. 6, the display device 7 includes a communication I/F 71, a control unit 73, a storage unit 75, and a display unit 77.

(Communication I/F)

The communication I/F 71 is a communication module that transmits or receives data to or from the signal processing apparatus 1 in a wired/wireless manner. For example, the communication I/F 71 receives information such as IDs, face images, and current positions of the user and the target user from the signal processing apparatus 1. Further, when the signal processing apparatus 1 has recognized the selection request of the user, the communication I/F 71 receives the selected user's ID. Further, the communication I/F 71 may transmit setting information for setting, for example, a playback volume of the speaker 20 or a sound acquisition level by the microphone 10 which is set by the user in advance to a volume or a level desired by the user to the signal processing apparatus 1.

(Control Unit)

The control unit 73 functions as an arithmetic processing device and a control device, and controls an overall operation of the display device 7 according to various kinds of programs. For example, the control unit 73 is implemented by a CPU or a microprocessor.

(Storage Unit)

The storage unit 75 stores information received from the signal processing apparatus 1 through the communication I/F 71. For example, the storage unit 75 stores information such as IDs, face images, and current positions of the user and the target user and an ID of the target user selected in the selection request.

(Display Unit)

The display unit 77 displays the conversation status such as a person with whom the user is currently conversing or a person with whom the user is currently privately conversing based on the information received from the signal processing apparatus 1 through the communication I/F 71. For example, the display unit 77 may display an image of the target user in a private conversation through a solid image and display the other target users through a faint image. Alternatively, the display unit 77 may display an image of the target user in a private conversation through an enlarged image and display the other target users through a reduced image. For example, the display unit 77 is implemented by a liquid crystal display (LCD) or an organic light-emitting diode (OLED).

The configuration of the display device 7 has been described above with reference to FIG. 6, but the display device 7 may have a function of receiving an input of the call origination request, the selection request, the selection release request, or any other command from the user but also a function of displaying the conversation status. Another example of the display device 7 capable of receiving an input of a command will be described below with reference to FIG. 7.

Figure 7:
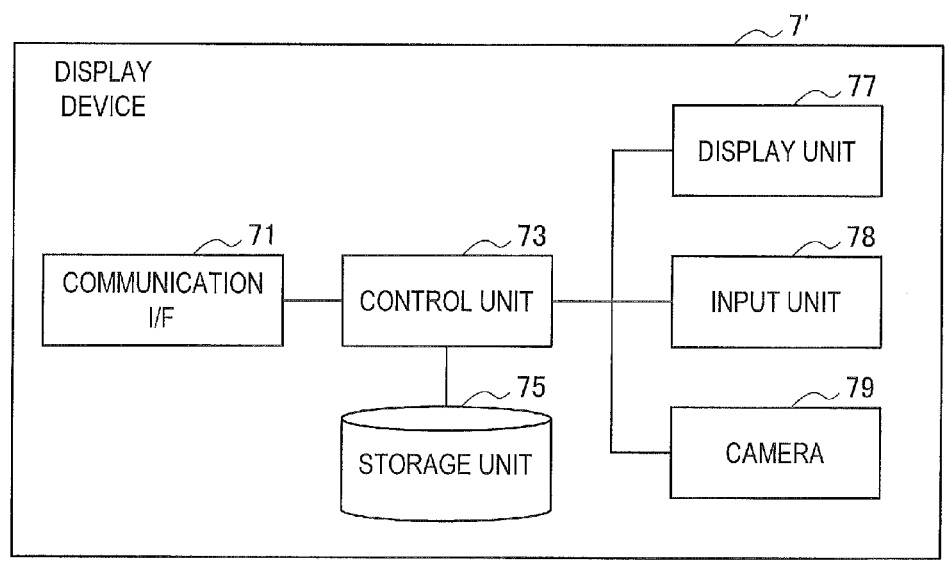
FIG. 7 is a block diagram illustrating an exemplary configuration of the display device according to the present embodiment.

FIG. 7 is a block diagram illustrating an exemplary configuration of a display device 7' according to the present embodiment. As illustrated in FIG. 7, the display device 7' includes an input unit 78 and a camera 79 in addition to the communication I/F 71, the control unit 73, the storage unit 75, and the display unit 77.

(Input Unit)

The input unit 78 has a function of receiving an input of a command from the user. For example, the input unit 78 is implemented by a keyboard, a mouse, or the like. Further, the input unit 78 may be implemented by a touch panel configured integrally with the display unit 77.

(Camera)

The camera 79 has a function of photographing the user's appearance. An image photographed by the camera 79 is output to the control unit 73 and used for gesture detection and command recognition by the control unit 73.

The components of the acoustic system according to the embodiment of the present disclosure have been described above. Next, an access process of a plurality of accesses through the acoustic system according to the present embodiment will be described in order with reference to FIGS. 8 to 11.

<3. Multi-space Access Process>

[3-1. Basic Process]

Figure 8:
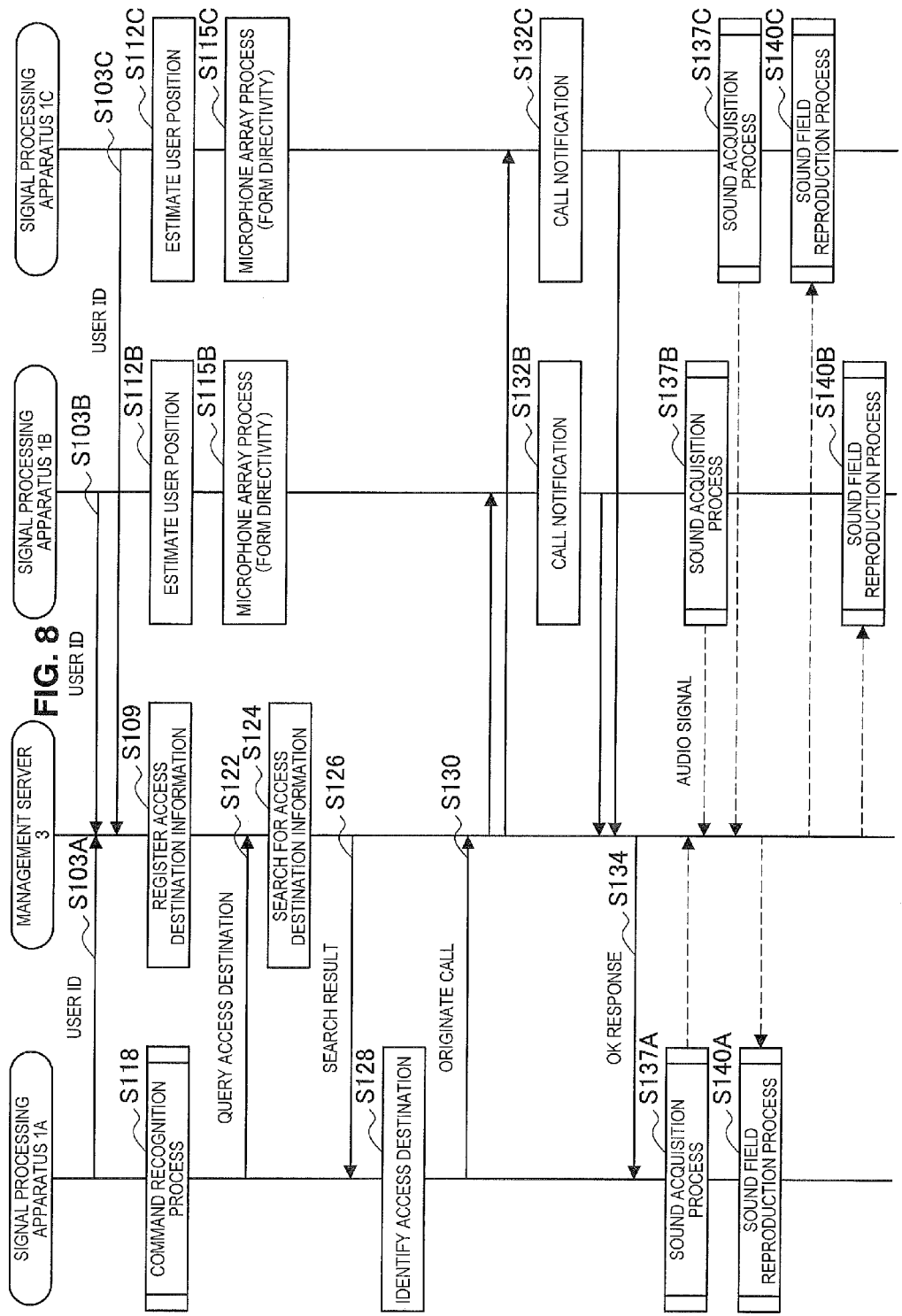
FIG. 8 is a flowchart illustrating a basic process of a multi-space access operation according to the present embodiment.

FIG. 8 is a flowchart illustrating a basic process of a multi-space access operation according to the present embodiment. As illustrated in FIG. 8, first of all, in step S103A, the signal processing apparatus 1A transmits an ID of the user A located at the site A to the management server 3. The signal processing apparatus 1A may acquire an ID of the user A from a tag such as a radio frequency identification (RFID) tag possessed by the user A or from the user A's voice. Further, the signal processing apparatus 1A may read biological information from the user A (a face, an eye, a hand, or the like), and acquire the biological information as an ID.

Meanwhile, in step S103B, the signal processing apparatus 1B similarly transmits an ID of the user B located at the site B to the management server 3. This process is similarly performed in step S103C.

Next, in step S109, the management server 3 identifies the user based on the user ID transmitted from each signal processing apparatus 1, and registers, for example, an IP address of the signal processing apparatus 1 of the transmission source as the access destination information in association with, for example, the identified user's name.

Next, in step S112B, the signal processing apparatus 1B estimates the position of the user B located at the site B. Specifically, the signal processing apparatus 1B estimates the user B's relative position to the plurality of microphones 10B arranged at the site B.

Next, in step S115B, the signal processing apparatus 1B performs the microphone array process on the audio signals acquired by the plurality of microphones 10B arranged at the site B based on the user B's estimated relative position so that the sound acquisition position is focused on the user B's mouth. As described above, the signal processing apparatus 1B prepares for the user B to utter something.

Meanwhile, in steps S112C and S115C, the signal processing apparatus 1C similarly estimates the positions of the users C1 and C2 located at the site C, and prepares for the users C1 and C2 to utter something.

In step S118, the signal processing apparatus 1A similarly performs the microphone array process on the audio signals acquired by the plurality of microphones 10A arranged at the site A so that the sound acquisition position is focused on the user A's mouth, and prepares for the user A to utter something. Then, the signal processing apparatus 1A recognizes a command based on the user A's voice (utterance). Here, the description will continue with an example in which the user A utters "I'd like to speak with B, C1, and C2," and the signal processing apparatus 1A recognizes the utterance as a command of the "call origination request to the users B, C1, and C2." A command recognition process according to the present embodiment will be described in detail in [3-2. Command recognition process] which will be described later.

Next, in step S122, the signal processing apparatus 1A sends the access destination query to the management server 3. When the command is the "call origination request to the users B, C1, and C2" as described above, the signal processing apparatus 1A queries the access destination information of the user B.

Next, in step S124, the management server 3 searches for the access destination information of the users B, C1, and C2 in response to the access destination query from the signal processing apparatus 1A, and then, in step S126, transmits the search result to the signal processing apparatus 1A.

Next, in step S128, the signal processing apparatus 1A identifies an access destination based on the access destination information of the users B, C1, and C2 received from the management server 3.

Next, in step S130, the signal processing apparatus 1A performs a process of originating a call to the signal processing apparatus 1B and the signal processing apparatus 1C through the management server 3 based on the identified access destination information of the users B, C1, and C2. For example, the signal processing apparatus 1A performs the process of originating a call to the signal processing apparatuses 1B and 1C based on an IP address of the signal processing apparatus 1B corresponding to the site B in which the user B is currently located and an IP address of the signal processing apparatus 1C corresponding to the site C in which the users C1 and C2 are currently located.

Next, in step S132B, the signal processing apparatus 1B outputs a message asking the user B whether to answer a call from the user A or not. Specifically, for example, the signal processing apparatus 1B may reproduce a corresponding message through the speaker 20B arranged around the user B. Further, the signal processing apparatus 1B recognizes the user B's response to the call notification based on the user B's voice acquired through the plurality of microphones 10B arranged around the user B.

Meanwhile, in step S132C, the signal processing apparatus 1C similarly outputs a message of asking the users C1 and C2 whether to answer a call from the user A, and recognizes responses of the users C1 and C2 to the call notification.

Next, in step S134, the signal processing apparatuses 1B and 1C transmit the responses of the users B, C1, and C2 to the signal processing apparatus 1A through the management server 3. Here, the users B, C1, and C2 give an OK response, and thus two-way communication starts among the user A (the signal processing apparatus 1A side), the user B (the signal processing apparatus 1B side), and the users C1 and C2 (the signal processing apparatus 1C side).

Specifically, in step S137A, in order to start communication with the signal processing apparatuses 1B and 1C, the signal processing apparatus 1A performs a sound acquisition process of acquiring the user A's voice at the site A and transmitting an audio stream (an audio signal) to the site B (the signal processing apparatus 1B side) and the site C (the signal processing apparatus 1C side). The sound acquisition process according to the present embodiment will be described in detail in [3-3. Sound acquisition process] which will be described later.

In step S137C, the signal processing apparatus 1C similarly acquires the user C's voice at the site C, and performs a transmission process of transmitting the audio signal to the site A and the site C through the management server 3.

Then, in step S140B, the signal processing apparatus 1B forms the acoustically closed surface surrounding the user B through the plurality of speakers 20B arranged around the user B, and performs a sound field reproduction process based on the audio stream transmitted from the signal processing apparatuses 1A and 1C. The sound field reproduction process according to the present embodiment will be described in detail in [3-4. Sound field reproduction process] which will be described later.

In steps S137A to S140B described above, one-way communication has been described as an example, but in the present embodiment, two-way communication can be performed. In other words, unlike steps S137A to S140B described above, the signal processing apparatuses 1B and 1C may perform the sound acquisition process, and the signal processing apparatus 1A may perform the sound field reproduction process. Alternatively, the signal processing apparatuses 1A and 1B may perform the sound acquisition process, and the signal processing apparatus 1C may perform the sound field reproduction process.

The basic process of the operation of accessing a plurality of spaces in the acoustic system according to the present embodiment has been described above. Through the above-described process, the user A can converse with the users B, C1, and C2 located in different places by uttering "I'd like to speak with B, C1, and C2" without carrying a mobile phone terminal, a smart phone, or the like. Next, the command recognition process performed in step S118 will be described in detail with reference to FIG. 9.

[3-2. Command Recognition Process]

Figure 9:
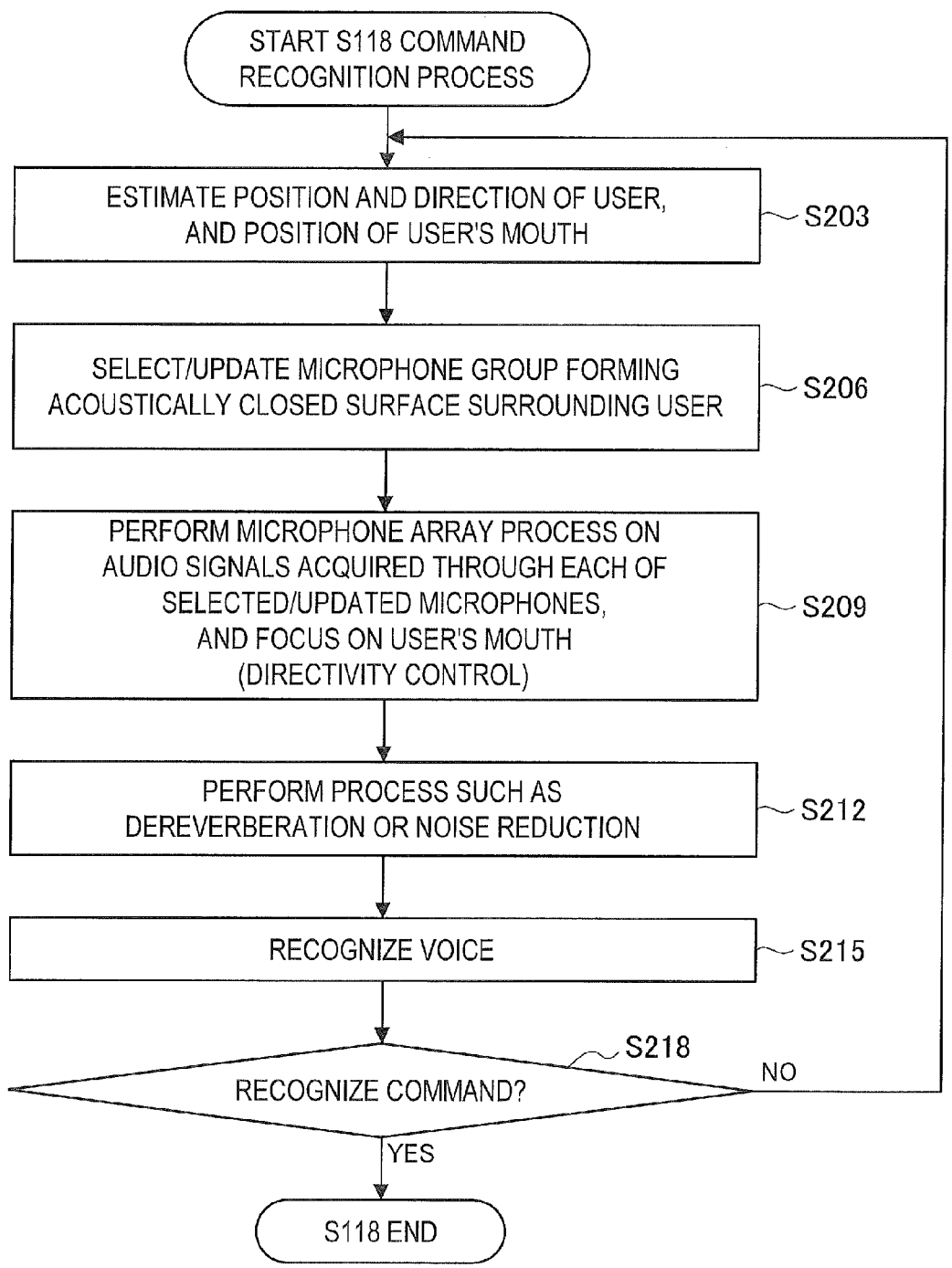
FIG. 9 is a flowchart illustrating a command recognition process according to the present embodiment.

FIG. 9 is a flowchart illustrating the command recognition process according to the present embodiment. As illustrated in FIG. 9, first of all, in step S203, the user position estimating unit 14 of the signal processing apparatus 1 estimates the user's position. For example, the user position estimating unit 14 may estimate the relative position and direction of the user to each microphone 10, and the position of the user's mouth based on sounds acquired through the plurality of microphones 10, an arrangement of the microphones stored in the microphone position information DB 53, or the like. In addition, the user position estimating unit 14 may perform an estimation based on a photographed image photographed by the camera 30, the detection result obtained by the IR thermal sensor 40, an arrangement of the cameras 30 stored in the camera position information DB 51, or the like.

Next, in step S206, the signal processing unit 15 selects the microphone group forming the acoustically closed surface surrounding the user according to the user's relative position and direction, and the position of the user's mouth estimated by the user position estimating unit 14.

Next, in step S209, the microphone array processing unit 151 of the signal processing unit 15 performs the microphone array process on the audio signals acquired through the selected microphone group, and controls directivity of the microphones 10 to be focused on the user's mouth. Through this process, the signal processing apparatus 1 can prepare for the user to utter something.

Next, in step S212, the high S/N processing unit 153 performs a process such as dereverberation or noise reduction on the audio signal processed by the microphone array processing unit 151 to improve the S/N ratio.

Next, in step S215, the recognizing unit 131 performs voice recognition (voice analysis) based on the audio signal output from the high S/N processing unit 153.

Then, in step S218, the recognizing unit 131 performs the command recognition process based on the recognized voice (audio signal). There is no particular restriction to concrete content of the command recognition process, but for example, the recognizing unit 131 may recognize a command by comparing a previously registered (learned) request pattern with the recognized voice.

When it is difficult to recognize a command in step S218 (No in S218), the signal processing apparatus 1 repeatedly performs the process performed in steps S203 to S215. At this time, since steps S203 and S206 are also repeated, the signal processing unit 15 can update the microphone group forming the acoustically closed surface surrounding the user according to the user's movement.

[3-3. Sound Acquisition Process]

Figure 10:
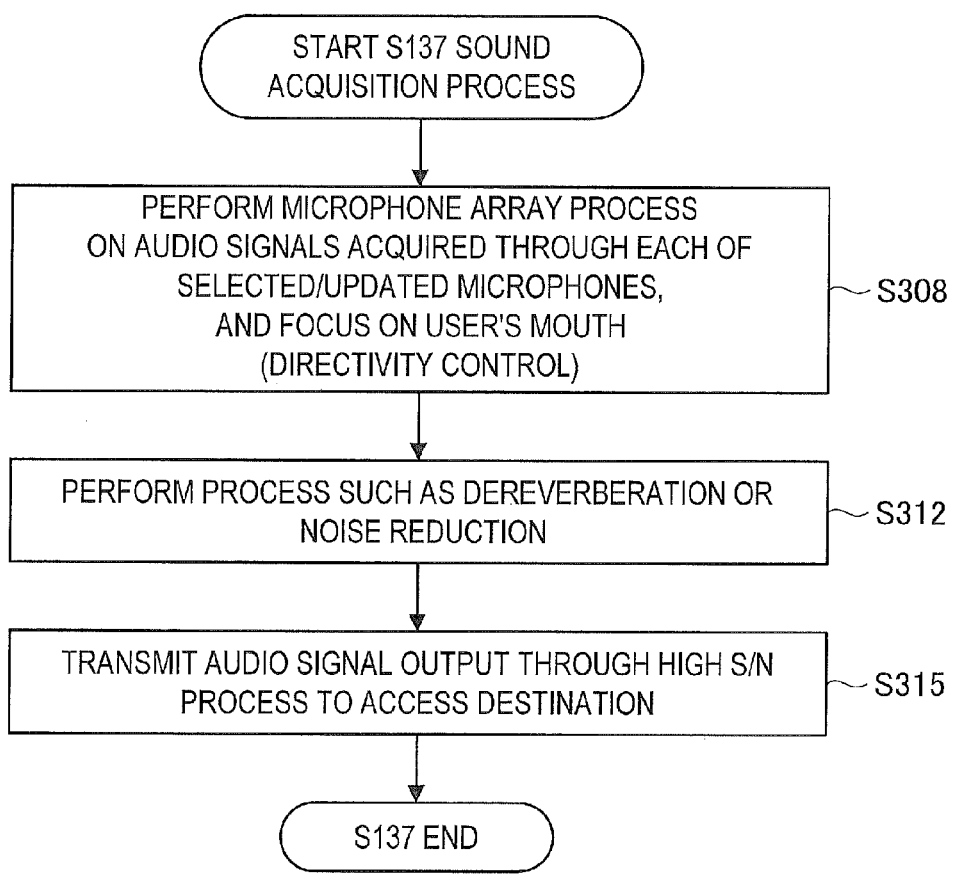
FIG. 10 is a flowchart illustrating a sound acquisition process according to the present embodiment.

Next, the sound acquisition process performed in step S137 (S137A, S137B, and S137C) of FIG. 8 will be described in detail with reference to FIG. 10. FIG. 10 is a flowchart illustrating the sound acquisition process according to the present embodiment. As illustrated in FIG. 10, first of all, in step S308, the microphone array processing unit 151 of the signal processing unit 15 performs the microphone array process on the audio signals acquired through the selected/updated microphones 10, and controls directivity of the microphones 10 to be focused on the user's mouth.

Next, in step S312, the high S/N processing unit 153 performs the process such as dereverberation or noise reduction on the audio signal processed by the microphone array processing unit 151 to improve the S/N ratio.

Then, in step S315, the output control unit 17 transmits the audio signal output from the high S/N processing unit 153 to the access destination represented by the access destination information of the target user identified in step S128 (see FIG. 8) through the communication I/F 19. Through this process, for example, a voice uttered by the user A at the site A is acquired by the plurality of microphones 10A arranged around the user A and then transmitted to the sites B and C.

[3-4. Sound Field Reproduction Process]

Figure 11:
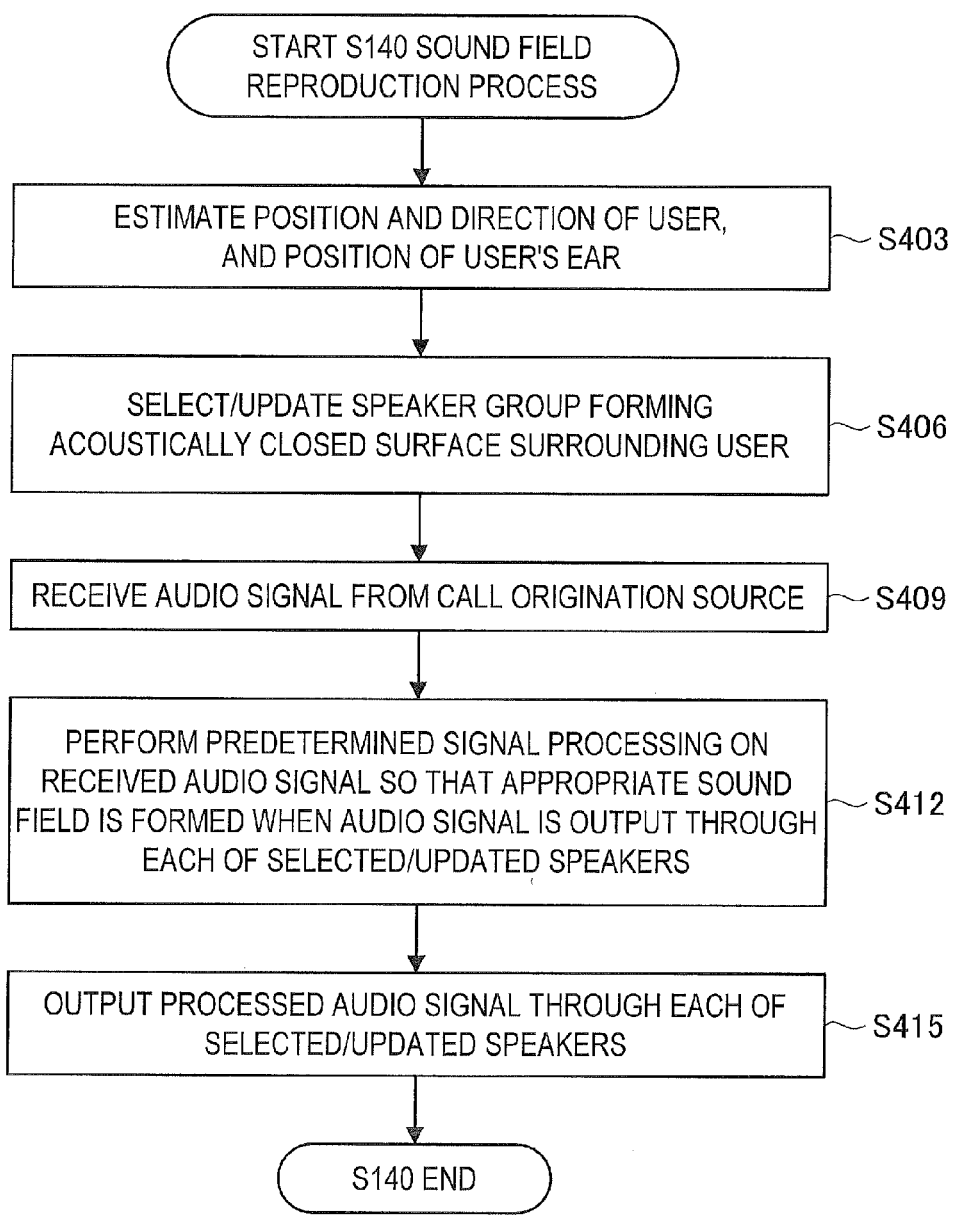
FIG. 11 is a flowchart illustrating a sound field reproduction process according to the present embodiment.

Next, the sound field reproduction process performed in step S140 (S140A, S140B, and S140C) of FIG. 8 will be described in detail with reference to FIG. 11. FIG. 11 is a flowchart illustrating the sound field reproduction process according to the present embodiment. As illustrated in FIG. 11, first of all, in step S403, the user position estimating unit 14 of the signal processing apparatus 1 estimates the user's position.

Next, in step S406, the signal processing unit 15 selects the speaker group forming the acoustically closed surface surrounding the user according to the estimated relative position and direction of the user, and the position of the user's ear. Further, steps S403 and S406 are continuously performed, and thus the signal processing unit 15 can update the speaker group forming the acoustically closed surface surrounding the user according to the user's movement.

Next, in step S409, the communication I/F 19 receives an audio signal from a call origination source.

Next, in step S412, the sound field reproduction signal processing unit 155 of the signal processing unit 15 performs predetermined signal processing on the received audio signal so that an appropriate sound field is formed when the audio signal is output through the selected/updated speakers 20. For example, the sound field reproduction signal processing unit 155 performs rendering on the received audio signal according to the environment (an arrangement of the plurality of speakers 20 arranged on a road, a street lamp, and a wall surface) of the site B.

Then, in step S415, the output control unit 17 outputs the audio signal processed by the sound field reproduction signal processing unit 155 through the speaker group selected/updated in step S406 through the DAC/amplifying unit 21.

Through this process, the user A's voice acquired at the site A is played back through the plurality of speakers 20B arranged around the user B located at the site B. Further, in step S412, when rendering is performed on the received audio signal according to the environment of the site B, the sound field reproduction signal processing unit 155 may perform signal processing such that a sound field of the site A is constructed.

Specifically, the sound field reproduction signal processing unit 155 may implement the sound field of the site A based on an ambient sound of the site acquired in real time, measurement data (transfer function) of an impulse response at the site A, or the like. Thus, for example, the user B located at the outdoor site B can obtain a sound field feeling as if the user B were located indoors like the user A located at the indoor site A and can feel more affluent reality.

Further, the sound field reproduction signal processing unit 155 can control an audio image of the received audio signal (the user A's voice) using the speaker group arranged around the user B. For example, as the array speaker (beam forming) is formed by the plurality of speakers 20, the sound field reproduction signal processing unit 155 reconstructs the user A's voice in the user B's ear. Further, the sound field reproduction signal processing unit 155 reconstructs the user A's audio image outside the acoustically closed surface surrounding the user B through the array speaker.

<4. Access Space Selection Process>

The acoustic system according to the present embodiment recognizes the selection request through various forms of commands. Here, a command represented by the selection request preferably has a format that is not noticed by any users who are not selected in the selection request. For example, if the user A were to mutter "I'd like to speak only with C1" during a conversation with the users B, C1, and C2, the users B and C2 would also hear the muttering. In this regard, in the present disclosure, a format of the selection request that is not noticed by any users who are not selected in the selection request is proposed.

[4-1. First Access Space Selection Process]

Figure 12:
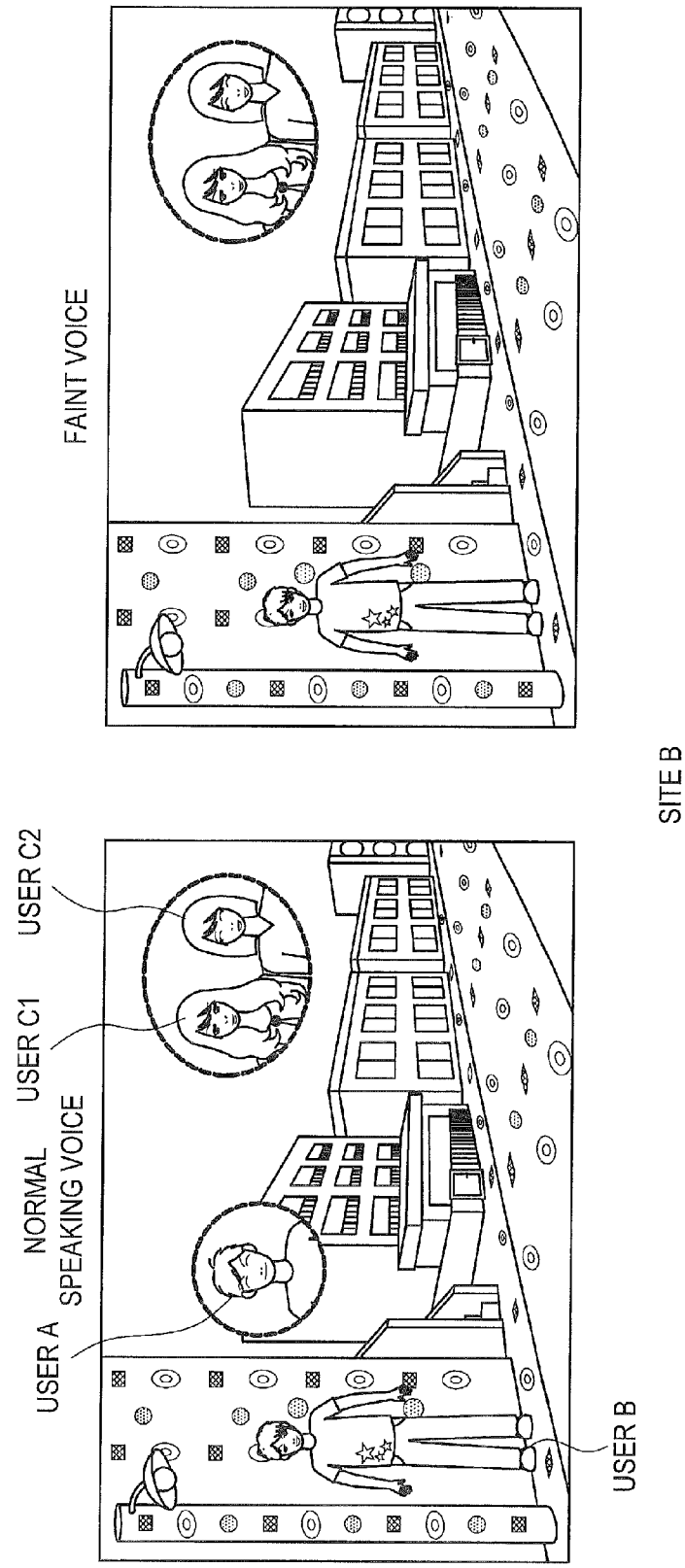
FIG. 12 is an explanatory diagram illustrating an exemplary outline of an access space selection process according to the present embodiment.

FIG. 12 is an explanatory diagram illustrating an exemplary outline of an access space selection process according to the present embodiment. As illustrated in FIG. 12, the acoustic system may recognize the selection request based on a volume of a voice spoken by the user. A case in which the user B at the site B is conversing with the users A, C1, and C2 is assumed. At this time, when the user B speaks faintly, the user B can privately converse with the users C1 and C2. Further, when the user B speaks in a normal speaking voice, the user B can return to a conversation with the users A, C1, and C2. An operation process related to this selection request will be described with reference to FIG. 13.

Figure 13:
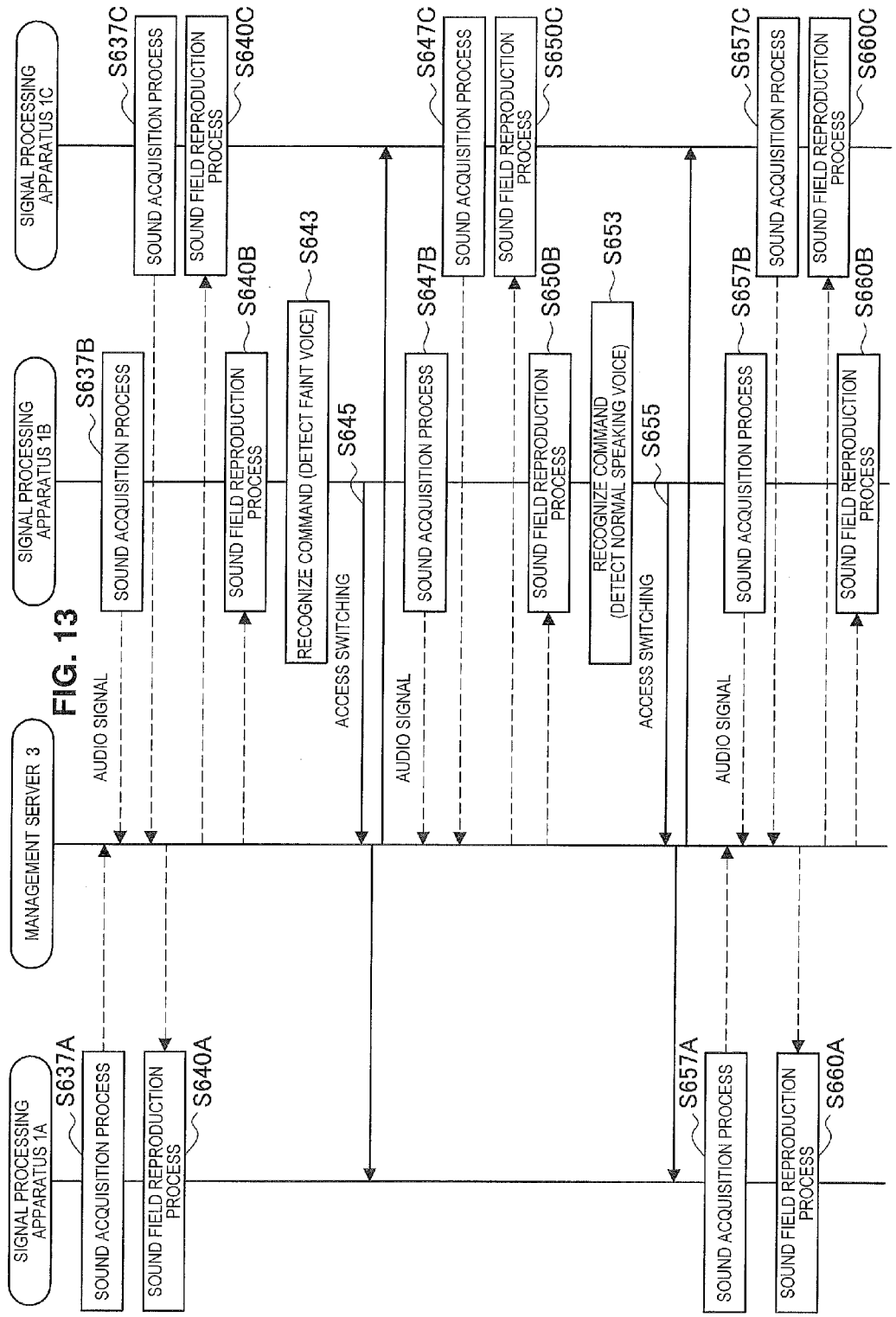
FIG. 13 is a flowchart illustrating an exemplary access space selection process according to the present embodiment.

FIG. 13 is a flowchart illustrating an exemplary access space selection process according to the present embodiment. Here, FIG. 13 illustrates the operation process after the sites A, B, and C have access to one another through the multi-space access process described above with reference to FIG. 8. As illustrated in FIG. 13, in steps S637 (S637A, S637B, and S637C) and S640 (S640A, S640B, S640C), the users A, B, C1, and C2 are conversing in normal speaking voices. In the operation process of steps S637 and 640, the same operation process as described in steps S137 and S140 (see FIGS. 10 and 11) is performed.

At this time, when the user B speaks faintly, in step S643, the recognizing unit 131 recognizes a command based on a volume of a voice spoken by the user B. Here, as an example, a faint voice representing the selection request designating the users C1 and C2 and a normal speaking voice representing the selection release request are assumed to be set in the signal processing apparatus 1B or the display device 7' at an arbitrary timing such as call origination notification (S132B). The recognizing unit 131 recognizes "the selection request for the users C1 and C2 by the user B" based on the setting information, and generates selection target setting information representing the "users B, C1, and C2."

Next, in step S645, the signal processing apparatus 1B performs an access switching process on the signal processing apparatuses 1A and 1C. Specifically, the signal processing apparatus 1B transmits the selection target setting information representing the "users B, C1, and C2" to the signal processing apparatus 1A and the signal processing apparatus 1C through the management server 3.

Here, the process of S645 performed by the signal processing apparatus 1B corresponding to the site B will be described. First of all, the recognizing unit 131 of the signal processing apparatus 1B outputs the selection target setting information representing the "users B, C1, and C2" to the output control unit 17 through the signal processing unit 15 and the signal processing unit 15. Here, the target users represented by the selection target setting information are the users B, C1, and C2, and include the user B corresponding to the signal processing apparatus 1B. Thus, the sound field reproduction signal processing unit 155 of the signal processing apparatus 1B writes only the audio signals from the target users (the users C1 and C2) represented by the selection target setting information (the users C1 and C2) in the output buffer. Then, the output control unit 17 of the signal processing apparatus 1B plays back only the voices of the users C1 and C2 through the speakers 20B. Further, the output control unit 17 of the signal processing apparatus 1B transmits the selection target setting information to the signal processing apparatus 1A and the signal processing apparatus 1C through the communication I/F 19.

Next, the process of S645 performed by the signal processing apparatus 1C corresponding to the site C will be described. First of all, the communication I/F 19 of the signal processing apparatus 1C receives the selection target setting information representing the "users B, C1, and C2." Here, the target users represented by the selection target setting information are the users B, C1, and C2 and include the users C1 and C2 corresponding to the signal processing apparatus 1C. Thus, the sound field reproduction signal processing unit 155 of the signal processing apparatus 1C writes only the audio signals from the target users represented by the selection target setting information (the user B) in the output buffer. Then, the output control unit 17 of the signal processing apparatus 1C plays back only the user B's voice through the speakers 20C.

Lastly, the process of step S645 performed by the signal processing apparatus 1A corresponding to the site A will be described. First of all, the communication I/F 19 of the signal processing apparatus 1A receives the selection target setting information representing the "users B, C1, and C2." Here, the target users represented by the selection target setting information are the users B, C1, and C2, and do not include the user A corresponding to the signal processing apparatus 1A. Thus, the sound field reproduction signal processing unit 155 of the signal processing apparatus 1A does not write the audio signals from the target users represented by the selection target setting information (the users B, C1, and C2) in the output buffer. For this reason, the output control unit 17 of the signal processing apparatus 1A does not reproduce the voices of the users B, C1, and C2 through the speakers 20A.

Next, in steps S647 (S647B and S647C) and S650 (S650B and S650C), the user B privately converses with the users C1 and C2 faintly. In the operation process of steps S637 and 640, the same operation process as in steps S637 and S640 is performed.

Next, when a voice volume of the user B returns from the faint voice to the normal speaking voice, in step S653, the recognizing unit 131 recognizes the "selection release request," and generates selection target setting information representing the "users A, B, C1, and C2."

Next, in step S655, the signal processing apparatus 1B performs the access switching process on the signal processing apparatuses 1A and 1C. Specifically, the signal processing apparatus 1B transmits the selection target setting information representing the "users A, B, C1, and C2" to the signal processing apparatus 1A and the signal processing apparatus 1C.

Here, the process of step S655 performed by the signal processing apparatus 1B corresponding to the site B will be described. First of all, the recognizing unit 131 of the signal processing apparatus 1B outputs the selection target setting information representing the "users A, B, C1, and C2" to the output control unit 17 through the signal processing unit 15, and the signal processing unit 15. Here, the target users represented by the selection target setting information include the user B. Thus, the sound field reproduction signal processing unit 155 of the signal processing apparatus 1B writes the audio signals from the target users (the users A, C1, and C2) represented by the selection target setting information in the output buffer. Then, the output control unit 17 of the signal processing apparatus 1B plays back the voices of the users A, C1, and C2 through the speakers 20B. Further, the output control unit 17 of the signal processing apparatus 1B transmits the selection target setting information to the signal processing apparatus 1A and the signal processing apparatus 1C through the communication I/F 19.

Next, the process of step S655 performed by the signal processing apparatus 1C corresponding to the site C will be described. First of all, the communication I/F 19 of the signal processing apparatus 1C receives the selection target setting information representing the "users A, B, C1, and C2." Here, the target users represented by the selection target setting information include the users C1 and C2. Thus, the sound field reproduction signal processing unit 155 of the signal processing apparatus 1C writes the audio signals from the target users (the users A and B) represented by the selection target setting information in the output buffer. Then, the output control unit 17 of the signal processing apparatus 1C plays back the voices of the users A and B through the speakers 20C.

Lastly, the process of step S655 performed by the signal processing apparatus 1A corresponding to the site A will be described. First of all, the communication I/F 19 of the signal processing apparatus 1A receives the selection target setting information representing the "users A, B, C1, and C2." Here, the target users represented by the selection target setting information include the user A. Thus, the sound field reproduction signal processing unit 155 of the signal processing apparatus 1A writes the audio signals from the target users (the users B, C1, and C2) represented by the selection target setting information in the output buffer. For this reason, the output control unit 17 of the signal processing apparatus 1A plays back the voices of the users B, C1, and C2 through the speakers 20A.

Next, in steps S657 (S657A, S657B, and S657C) and S660 (S660A, S660B, and S660C), the users A, B, C1, and C2 converse in normal speaking voices. In the operation process of steps S657 and 660, the same operation process as in steps S637 and S640 is performed.

(Supplement)

In steps S645, S647, and S650, the signal processing apparatus 1 plays back only the voice of the user included in the selection target setting information, but the present disclosure is not limited to this example. For example, the signal processing apparatus 1 may reproduce the voice of the user who is not included in the selection target setting information. In other words, in S647, the signal processing apparatus 1B may reproduce the user A's voice as a background sound during the private conversation among the users B, C1, and C2.

Further, in steps S645, S647, and S650, an audio signal is transmitted and received between the signal processing apparatuses 1, and an audio signal to be played back is selectively played back based on the selection target setting information, but the present disclosure is not limited to this example. For example, the signal processing apparatus 1 may transmit the audio signal only to another signal processing apparatus 1 included in the selection target setting information. In other words, in step S647, the signal processing apparatus 1B may transmit the audio signal only to the signal processing apparatus 1C, and the signal processing apparatus 1C may transmit the audio signal only to the signal processing apparatus 1B.

In addition, the management server 3 may selectively transmit the audio signal received from another signal processing apparatus 1 to each signal processing apparatus 1 based on the selection target setting information received from each signal processing apparatus 1. In other words, the management server 3 may have the function of the sound field reproduction signal processing unit 155 and the function of the output control unit 17.

[4-2. Second Access Space Selection Process]

FIG. 14 is an explanatory diagram illustrating an exemplary outline of an access space selection process according to the present embodiment. As illustrated in FIG. 14, the acoustic system may recognize the selection request based on the user's language. A case in which the user B at the site B is conversing with the users A, C1, and C2 in Japanese is assumed. At this time, when the user B speaks Russian, the user B can privately converse with the user A. Further, when the user B speaks English, the user B can privately converse with the users C1 and C2. Then, when the user B speaks Japanese, the user B can return to a conversation with the users A, C1, and C2. An operation process related to this selection request will be described with reference to FIG. 15.

FIG. 15 is a flowchart illustrating an exemplary access space selection process according to the present embodiment. Here, FIG. 15 illustrates the operation process after the sites A, B and C have access to one another through the multi-space access process described above with reference to FIG. 8. As illustrated in FIG. 15, in steps S737 (S737A, S737B, and S737C) and S740 (S740A, S740B, and S740C), the users A, B, C1, and C2 are conversing in Japanese. In the operation process of steps S737 and 740, the same operation process as in steps S137 and S140 (see FIGS. 10 and 11) is performed.

At this time, when the user B speaks Russian, in step S743, the recognizing unit 131 recognizes a command based on the user B's language. Here, as an example, Russian representing the selection request designating the user A, English representing the selection request designating the users C1 and C2, and Japanese representing the selection release request are assumed to be set in the signal processing apparatus 1B or the like as setting information. Thus, when the user B speaks Russian, the recognizing unit 131 recognizes the "selection request for the user A by the user B," and generates selection target setting information representing the "users B and A."

Next, in step S745, the signal processing apparatus 1B performs the access switching process on the signal processing apparatuses 1A and 1C, similarly to step S645 (FIG. 13). Then, in steps S747 (S747A and S747B) and S750 (S750A and S750B), the user B privately converses with the user A in Russian, similarly to steps S737 and 740.

Next, when the language spoken by the user B changes from Russian to English, in step S753, the recognizing unit 131 recognizes a command based on the user B's language. Specifically, when the user B speaks English, the recognizing unit 131 recognizes the "selection request for the users C1 and C2 by the user B," and generates selection target setting information representing the "users B, C1, and C2."

Next, in step S755, the signal processing apparatus 1B performs the access switching process on the signal processing apparatuses 1A and 1C, similarly to step S745. Then, in steps S757 (S757A and S757B) and S760 (S760A and S760B), the user B privately converses with the users C1 and C2 in English, similarly to steps S737 and 740.

[4-3. Third Access Space Selection Process]

FIG. 16 is an explanatory diagram illustrating an exemplary outline of an access space selection process according to the present embodiment. As illustrated in FIG. 16, the acoustic system may recognize the selection request based on a change in a positional relation between the position to which an audio image (voice output) is oriented and the user's position. A case in which the user A is conversing with the users B, C1, and C2 in a region (1) of the site A is assumed. Here, the audio image of the user B is assumed to be oriented to a region (2) side, and the audio images of the users C1 and C2 are assumed to be oriented to the region (3) side. At this time, when the user A moves to the region (2), the user A can privately converse with the user B. Further, when the user A moves to the region (3), the user A can privately converse with the users C1 and C2. Then, when the user A moves to the region (1), the user A can return to a conversation with the users B, C1, and C2. An operation process of orienting an audio image and an operation process related to this selection request will be described below in order with reference to FIGS. 17 and 18.

(Multi-space Access Process)

FIG. 17 is a flowchart illustrating an exemplary multi-space access operation according to the present embodiment. FIG. 17 is different from FIG. 8 in that steps S118 and S140A are replaced with steps S119 and S141A, and step S120 is added. Here, the description will proceed focused on the process of steps S119, S120, and S141A.

In step S119, the signal processing apparatus 1A recognizes a command based on the user A's voice (utterance), similarly to step S118. At this time, the signal processing apparatus 1A recognizes a command of "the call origination request to the users B, C1, and C2" and a command, and a command of a "multi-spot mode." Here, the "multi-spot mode" is an operation mode of separating the position at which an audio image is positioned for each target user when there are a plurality of target users. Here, as an example, the signal processing apparatus 1A is assumed to recognize a command by the user A by which the audio image of the user B is positioned at the region (2) side and the audio images of the users C1 and C2 are positioned at the region (3) side as setting information associated with the "multi-spot mode" command.

Next, in step S120, the signal processing apparatus 1 sets the multi-spot mode. Specifically, the sound field reproduction signal processing unit 155 divides the speaker group surrounding the user A such that the audio image of the user B is oriented to the region (2) and the audio images of the users C1 and C2 are oriented to the region (3) side based on the setting information associated with the "multi-spot mode" command. Then, the sound field reproduction signal processing unit 155 writes the audio signals from the users B, C1, and C2 in the output buffers of a plurality of channels according to the divided speaker group.

Then, in step S141A, the signal processing apparatus 1A performs the sound field reproduction process based on the audio signals transmitted from the signal processing apparatuses 1B and 1C, similarly to step S140. At this time, the signal processing apparatus 1A performs voice output based on the multi-spot mode setting set in step S120. Specifically, the output control unit 17 outputs the audio signal written in the output buffer by the sound field reproduction signal processing unit 155 through the speakers 20A, and orients the audio image of the user B to the region (2) side and the audio images of the users C1 and C2 to the region (3) side.

(Access Space Selection Process)

Figure 18:
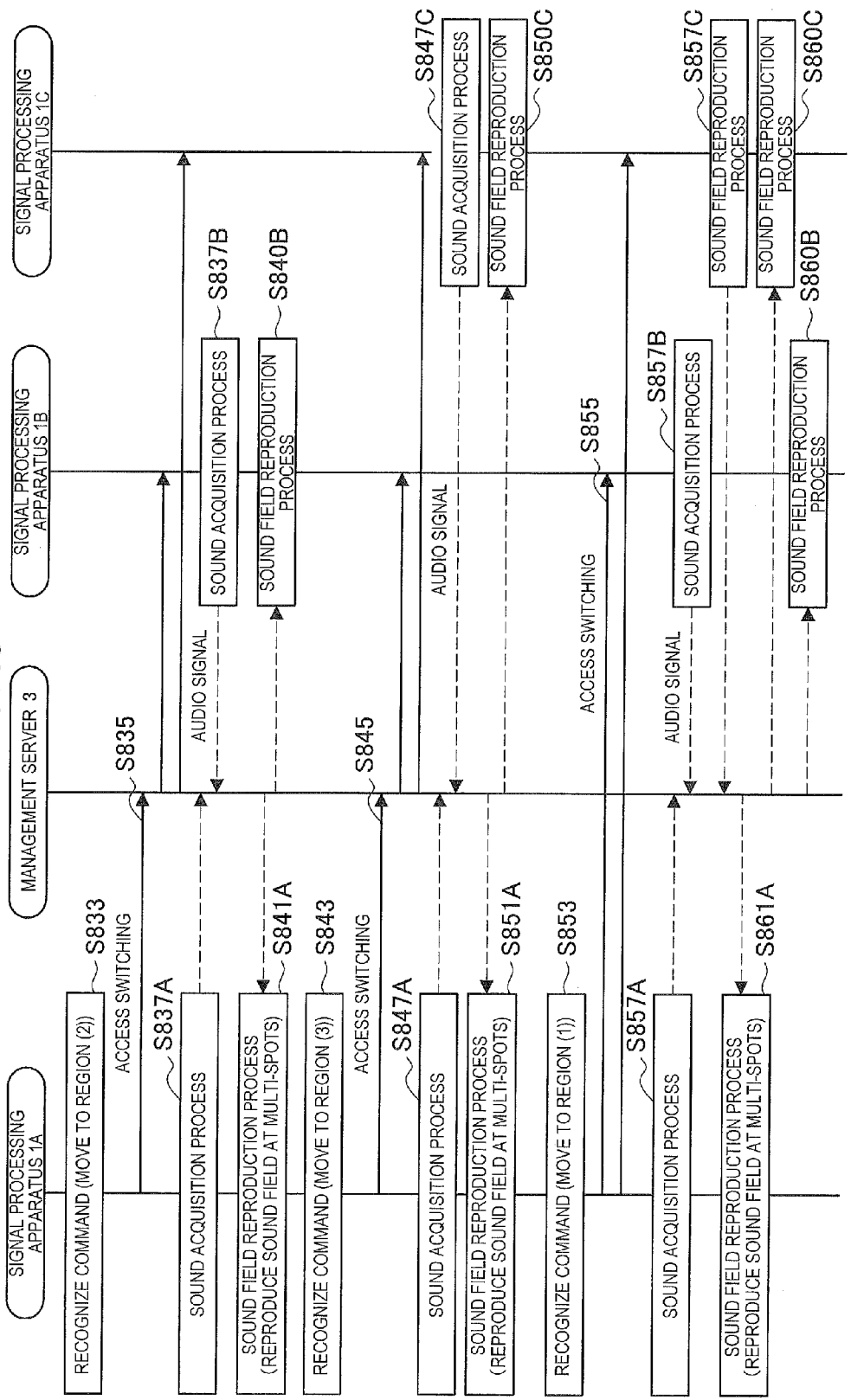
FIG. 18 is a flowchart illustrating an exemplary access space selection process according to the present embodiment.

FIG. 18 is a flowchart illustrating an exemplary access space selection process according to the present embodiment. Here, FIG. 18 illustrates an operation process after the sites A, B, and C have access to one another through the multi-space access process described above with reference to FIG. 17. As illustrated in FIG. 18, when the user A moves to the region (2), in step S833, the recognizing unit 131 recognizes a command based on the positional relation between the position to which the audio image is oriented and the position of the user A.

Here, as an example, movement to the region (2) representing the selection request designating the user B, movement to the region (3) representing the selection request designating the users C1 and C2, and movement to the region (1) representing the selection release request are assumed to be set in the signal processing apparatus 1A or the like as setting information. Thus, the recognizing unit 131 recognizes the "selection request for the user B by the user A" based on movement of the user A to the region (2), and generates selection target setting information representing the "users A and B."

Next, in step S835, the signal processing apparatus 1A performs the access switching process on the signal processing apparatuses 1B and 1C, similarly to step S645 (FIG. 13). Then, in steps S837A, S837B, S840B, and S841A, the user A privately converses with the user B in the region (2), similarly to steps S137, S140, and S141A (see FIGS. 10, 11, and 17).

Next, when the user A moves the region (3), in step S843, the recognizing unit 131 recognizes the "selection request for the users C1 and C2 by the user A," and generates selection target setting information representing the "users A, C1, and C2."

Next, in step S845, the signal processing apparatus 1A performs the access switching process on the signal processing apparatuses 1B and 1C, similarly to step S835. Then, in steps S847A, S847C, S850B, and S851A, the user A privately converses with the users C1 and C2 in the region (3), similarly to steps S137, S140, and S141A.

Next, when the user A moves the region (1), in step S853, the recognizing unit 131 recognizes the "selection release request," and generates selection target setting information representing the "users A, C1, and C2."

Next, in step S855, the signal processing apparatus 1A performs the access switching process on the signal processing apparatuses 1B and 1C, similarly to step S845. Then, in steps S857A, S857B, S857C, S860B, S860C, and S861A, the user A converses with the users B, C1, and C2 in the region (1), similarly to steps S137, S140, and S141A.

(Supplement)

In step S835, similarly to step S645 (FIG. 13), the acoustic system does not output the voice of the target user which is not included in the selection target setting information, but the present disclosure is not limited to this example. For example, the acoustic system may control a voice output level based on a change in the positional relation between the position to which the audio image is oriented and the user's position. In other words, for example, in step S841A, when the user A moves to the region (2) side, the signal processing apparatus 1A may turn down the volume of the voices of the users C1 and C2 to be output through the speakers 20A. Further, when the user A moves to the region (2) side, the signal processing apparatus 1A may turn up the volume of the voice of the user B to be output through the speakers 20A.

Further, when the multi-spot mode setting is performed in step S120, the signal processing apparatus 1 may control a lighting device (not shown) and cause light of different colors to illuminate each of the regions (1), (2), and (3). In this case, the user can visually recognize the position and the range of each region. Further, the signal processing apparatus 1 may cause increase the intensity of light illuminating a region corresponding to a target user who is speaking Further, the management server 3 may have a function of the sound field reproduction signal processing unit 155 and perform the multi-spot mode setting. Specifically, the management server 3 may divide the speaker group surrounding the user such that the audio image is oriented to the separated position based on the setting information associated with the "multi-spot mode" command.

[4-4. Fourth Access Space Selection Process]

The acoustic system may recognize the selection request based on whether the user's voice includes predetermined words. A case in which the user A is conversing with the users B, C1, and C2 is assumed. For example, when the user A clears his/her throat, the user A can privately converse with the user B, and when the user A says "Release selection request," the user A can return to a conversation with the users B, C, and C2. In other words, the signal processing apparatus 1A recognize the "selection request for the user B by the user A" when the user clears his/her throat, and recognizes the "selection release request" when the user says "Release selection request."

Further, when the user's voice includes prohibited words, the acoustic system may recognize the prohibited words as a disconnection request. Here, the disconnection request refers to a command for disconnecting a connection between the signal processing apparatuses 1. For example, when the user A says prohibited words such as confidential information or discriminatory words, the signal processing apparatus 1A may compulsorily disconnect a connection between the signal processing apparatus 1A and the signal processing apparatuses 1B and 1C.

[4-5. Fifth Access Space Selection Process]

The acoustic system may recognize the selection request based on a speed of the user's speech. A case in which the user A is conversing with the user B who is an adult and the users C1 and C2 who are children is assumed. For example, the user A converses with the user B at a normal speed, and converses with the users B, C1, and C2 at a slower speed. In other words, the signal processing apparatus 1A recognizes the user's normal-speed speech as the "selection request for the user B by the user A," and recognizes the user's slow speech as the "selection release request."

[4-6. Sixth Access Space Selection Process]

The acoustic system may recognize the selection request based on the user's gesture (motion). A case in which the user A is conversing with the users B, C1, and C2 is assumed. For example, the user A can privately converse with the user B when the user A stands up and can return to a conversation with the users B, C, and C2 when the user A sits down. In other words, the signal processing apparatus 1A recognizes the user's standing motion as the "selection request for the user B by the user A," and recognizes the user's sitting motion as the "selection release request."

[4-7. Seventh Access Space Selection Process]

The acoustic system may recognize the selection request based on the user's input received by the display device 7'. The user can input the selection request through the input unit 78. Further, the acoustic system may recognize the selection request based on the user's gesture using the camera 79.

[4-8. Process Associated with Access Space Selection Process]

The exemplary selection requests made by the acoustic system according to the present embodiment have been described above. Here, the user desires to check whether or not the selection request made by a voice or a gesture has actually been recognized, that is, whether or not a private conversation is currently in progress. Accordingly, for example, the user can check whether or not the selection request has been recognized through the display device 7. Otherwise, the acoustic system can notify the user of whether or not the selection request has been recognized through voice guidance. Specifically, when the recognizing unit 131 recognizes the selection request, the output control unit 17 outputs a notification signal for the user to the speaker 20. A notification process based on voice guidance will be described below with reference to FIG. 19.

Figure 19:
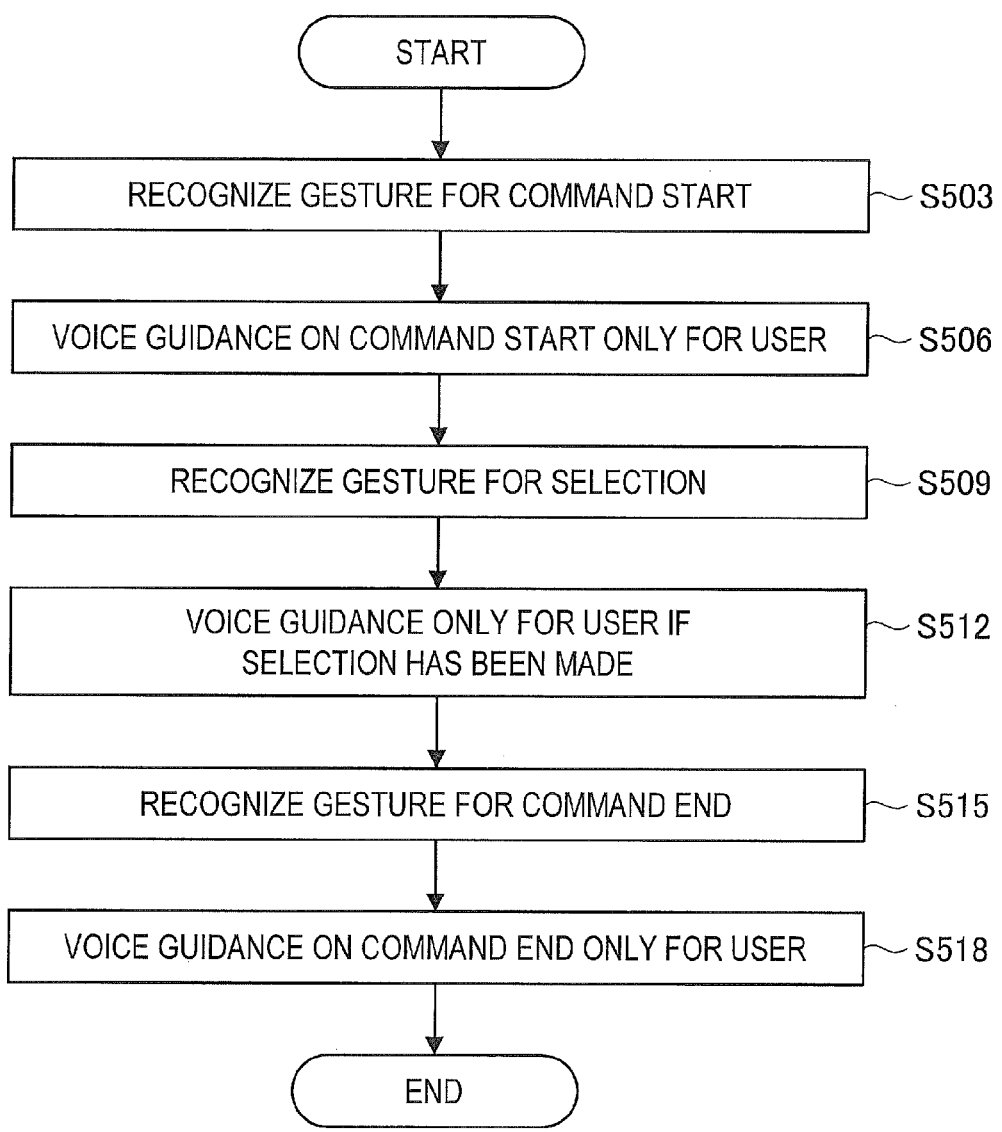
FIG. 19 is a flowchart illustrating a voice guidance process of the acoustic system according to the present embodiment.

FIG. 19 is a flowchart illustrating a voice guidance process of the acoustic system according to the present embodiment. As illustrated in FIG. 19, first of all, in step S503, the recognizing unit 131 recognizes a command representing "command start" based on the user's gesture.

Next, in step S506, the signal processing apparatus 1 outputs a message for notifying only the user who performed the gesture of the fact that the command representing the command start has been recognized. Specifically, the output control unit 17 plays back the message through the speakers 20 arranged around the user.

Further, the signal processing apparatus 1 may stop sound acquisition of the microphones 10 arranged around the speakers 20 playing back the message. Further, the signal processing apparatus 1 may reproduce the message through the speakers 20 arranged at the position away from the microphones 10 which are acquiring sounds. Thus, it is possible to prevent the other users from hearing the voice guidance.

Next, in step S509, the signal processing apparatus 1 recognizes a command representing the "selection request" based on the user's gesture. Then, in step S512, the signal processing apparatus 1 outputs a message for notifying only the user who has used the gesture of the fact that the command representing the "selection request" has been recognized.

Next, in step S515, the signal processing apparatus 1 recognizes a command representing "command end" based on the user's gesture. Then, in step S518, the signal processing apparatus 1 outputs a message for notifying only the user who has used the gesture of the fact that the command representing the "command end" has been recognized.

(Supplement)

Further, the signal processing apparatus 1 gives notification based on voice guidance when the selection request made by the gesture is recognized, but the present disclosure is not limited to this example. The signal processing apparatus 1 may give notification based on voice guidance when the selection request made by a voice is recognized. Further, the signal processing apparatus 1 may give notification based on voice guidance when the selection request made through the display device 7' is recognized.

<5. Modified Example of System Configuration>

The acoustic system according to the present embodiment can be implemented through various system configurations. The acoustic system has been described above as including a client-server type system configuration with reference to FIG. 2, but the present disclosure is not limited to this example. Another exemplary system configuration of the acoustic system will be described below.

[5-1. First Exemplary System Configuration]

(System Configuration)

Figure 20:
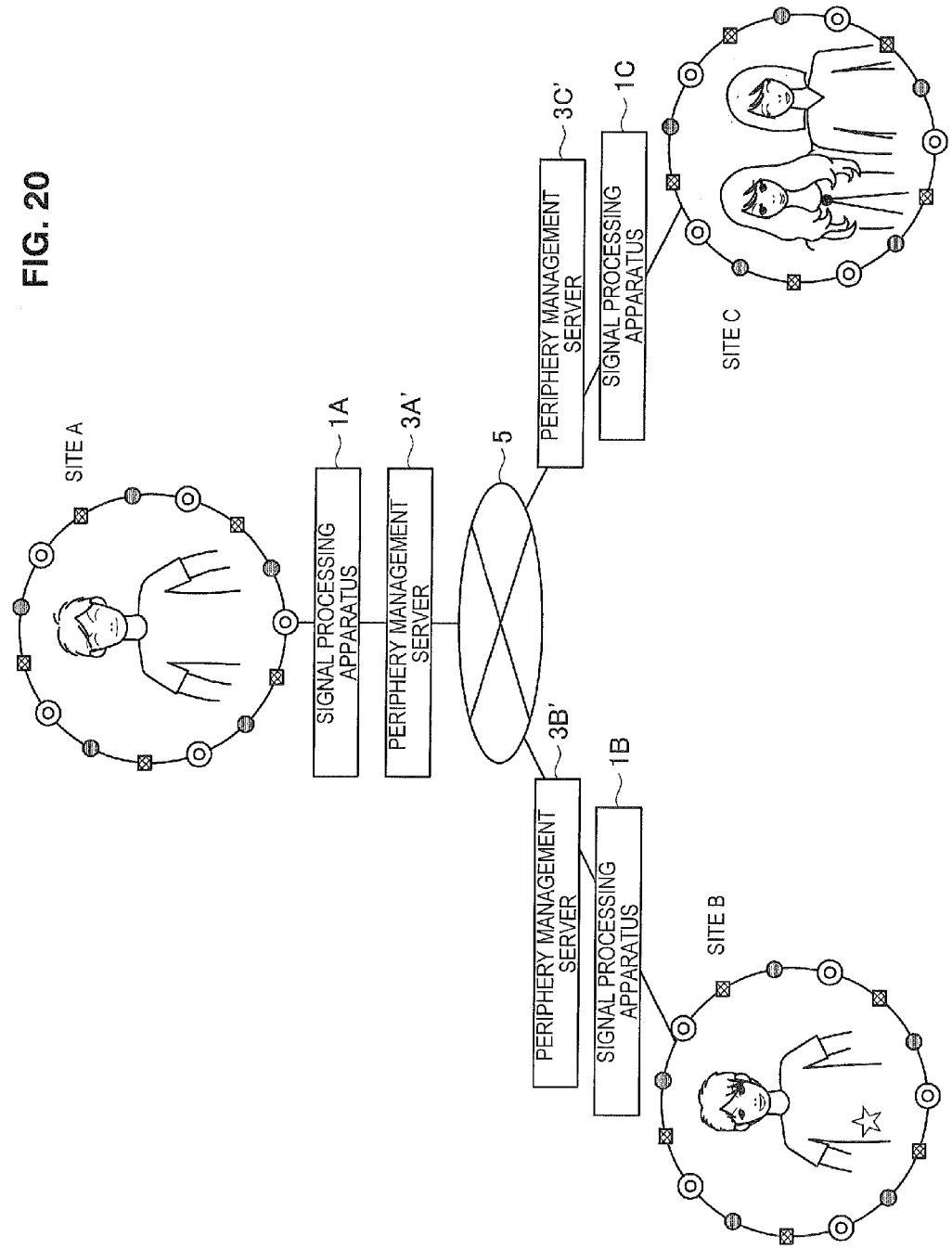
FIG. 20 is a diagram illustrating an exemplary overall configuration of the acoustic system according to the present embodiment.

FIG. 20 is a diagram illustrating an exemplary overall configuration of the acoustic system according to the present embodiment. As illustrated in FIG. 20, the acoustic system is a peer to peer (P2P) type system including periphery management servers 3A', 3B', and 3C' instead of the management server 3. Further, when it is unnecessary to distinguish the periphery management servers 3A', 3B', and 3C' from one another, the periphery management servers 3A', 3B', and 3C' are referred to collectively as a "periphery management server 3'."

The periphery management server 3' has a function of performing an authentication process of a user located nearby and managing an absolute position (current position) of the user. In addition, the periphery management server 3' may manage information (for example, an IP address) representing a nearby signal processing apparatus 1 or a position of a nearby place or building. Further, similarly to the management server 3, the periphery management server 3' may manage information such as a person with whom the user is currently conversing or a person with whom the user is privately conversing among users in a conversation. Further, the signal processing apparatus 1 may be configured integrally with the periphery management server 3'.

The periphery management server 3' performs an input or an output of a signal to or from the microphones 10 and the speakers 20 arranged in a predetermined space through the signal processing apparatus 1 arranged nearby. Further, as illustrated in FIG. 20, the P2P type acoustic system connects the microphones 10 and the speakers 20 arranged in a predetermined space including the user with the microphones 10 and the speakers 20 arranged in a predetermined space including the target user through a plurality of periphery management servers 3'. Through this operation, the P2P type acoustic system implements multi-space access and access space selection through a plurality of periphery management servers 3'. A multi-space access process performed by the P2P type acoustic system will be described below with reference to FIG. 21.

(Multi-space Access Process)

Figure 21:
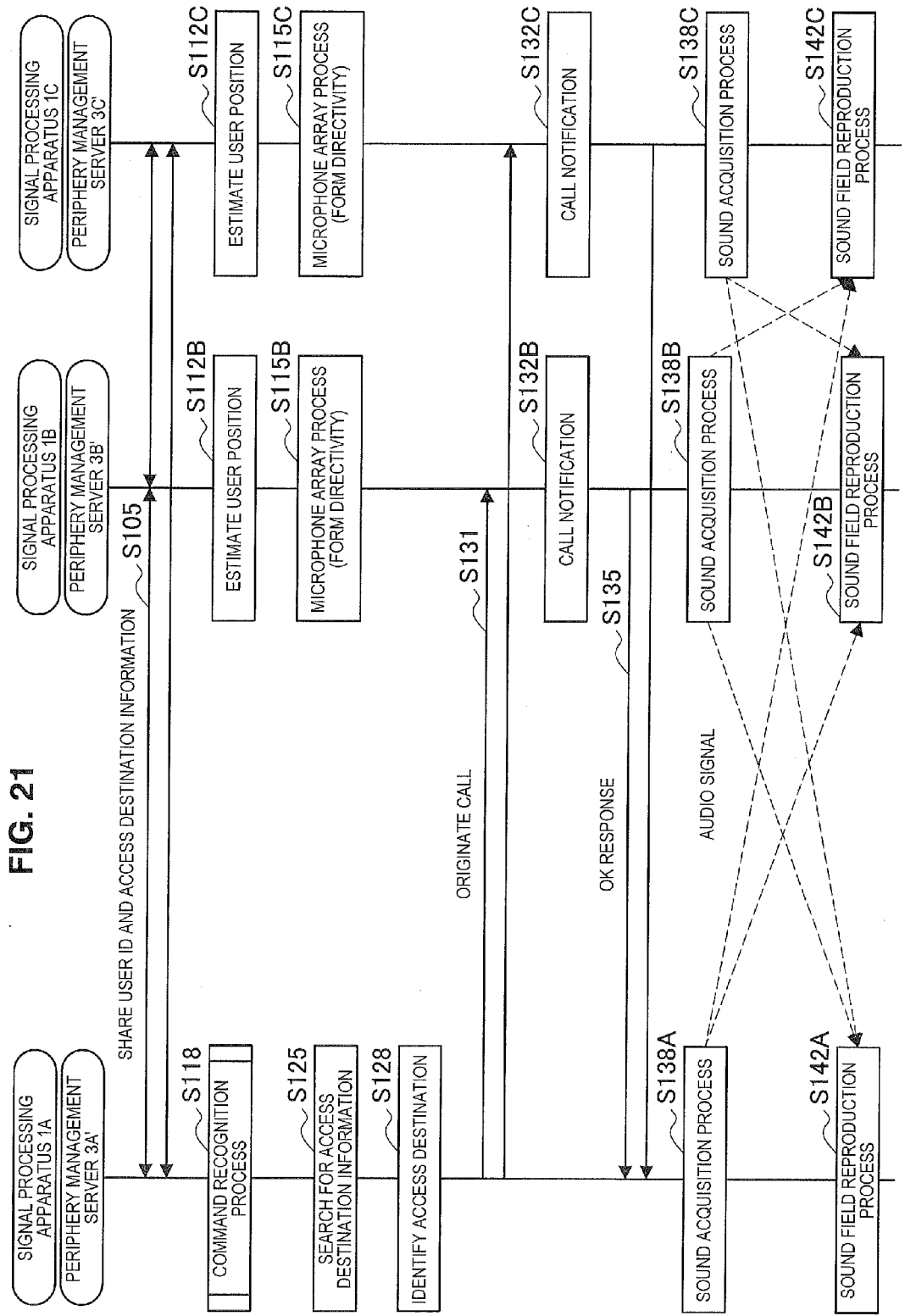
FIG. 21 is a flowchart illustrating an exemplary multi-space access operation according to the present embodiment.

FIG. 21 is a flowchart illustrating an exemplary multi-space access operation according to the present embodiment. As illustrated in FIG. 21, first of all, in step S105, the periphery management server 3' shares, for example, a user ID of the user located nearby and an IP address of the nearby signal processing apparatus 1 with the other periphery management servers 3'. Then, the operation process of steps S112B, S112C, S115B, S115C, and S118 is the same as described above with reference to FIG. 8, and thus a description thereof will be omitted.

Next, in step S125, the periphery management server 3' searches for the access destination information of the users B, C1, and C2 according to the command (the call origination request) recognized by the signal processing apparatus 1A in step S118.

Next, in step S131, the signal processing apparatus 1A performs the call origination process to the signal processing apparatuses 1B and 1C based on the access destination information of the users B, C1, and C2 identified in step S128. At this time, the signal processing apparatus 1A performs the call origination process to the signal processing apparatus 1B through the periphery management servers 3A' and 3B', and performs the call origination process to the signal processing apparatus 1C through the periphery management servers 3A' and 3C'.

Next, when the signal processing apparatuses 1B and 1C recognize the responses of the users B and C, respectively, in steps S132B and 132C, in step S135, the signal processing apparatuses 1B and 1C transmit the responses of the users B, C1, and C2 to the signal processing apparatus 1A. At this time, the signal processing apparatus 1B performs transmission of the responses to the signal processing apparatus 1A through the periphery management servers 3B' and 3A'. Further, the signal processing apparatus 1C performs transmission of the responses to the signal processing apparatus 1A through the periphery management servers 3C' and 3A'.

Next, in steps S138A, S138B, S138C, S142A, S142B, and S142C, each of the signal processing apparatuses 1 performs the sound acquisition process and the sound field reproduction process, similarly to steps S137 and S140 (see FIGS. 10 and 11). Here, transmission and reception of data between the signal processing apparatuses 1 are performed through transmission and reception of data between the periphery management servers 3'.

[5-2. Second Exemplary System Configuration]
(System Configuration)

FIG. 22 is a diagram illustrating an exemplary overall configuration of the acoustic system according to the present embodiment. As illustrated in FIG. 22, the acoustic system is a portable client-server type system including a portable management server 3" instead of the management server 3. Here, the signal processing apparatuses 1B and 1C may constitute a mesh network in which the signal processing apparatuses 1B and 1C are connected to each other via the network 5 without involving the portable management server 3".

The portable management server 3" has a function of performing an authentication process of an owner user and other users which are registered in advance and managing an absolute position (current position) of the owner user. Further, the portable management server 3" may manage information (for example, an IP address) representing a position of a place or a building which is registered in advance. As described above, the portable management server 3" has limited performance compared to the management server 3, and thus the amount of information managed by the portable management server 3" is limited. Further, similarly to the management server 3, the portable management server 3" may manage information such as a person with whom the user is currently conversing or a person with whom the user is privately conversing among users in a conversation. Further, the portable management server 3" may be a mobile phone, a smart phone, or any other mobile computer.

The portable management server 3" performs an input or an output of a signal to or from the microphones 10 and the speakers 20 arranged around the user and a predetermined target user who is registered in advance among predetermined sensors and output units which are registered in advance. Further, as illustrated in FIG. 22, the portable client-server type acoustic system connects the microphones 10 and the speakers 20 arranged around the user with the microphones 10 and the speakers 20 arranged around the target user through the portable management server 3". Through this operation, the portable client-server type acoustic system implements multi-space access and access space selection through the portable management server 3" that manages, for example, users and places which are registered in advance.

For example, when the user registers information such as a travel destination or a traveling companion to the portable client-server type acoustic system, the user can converse with a traveling companion, with whom her or she is traveling but who is located at a slightly different place, as if they were at the same place together.

A multi-space access process performed by the portable client-server type acoustic system will be described below with reference to FIG. 23.

(Multi-space Access Process)

FIG. 23 is a flowchart illustrating an exemplary multi-space access operation according to the present embodiment. As illustrated in FIG. 23, the portable management server 3" performs communication with the signal processing apparatus 1A corresponding to a place at which the user A carrying the portable management server 3" is located and the signal processing apparatuses 1B and 1C corresponding to places which are registered in advance. In other words, when the users B, C1, and C2 registered to the portable management server 3" in advance are located at the sites B and C which are registered in advance, in steps S103B and 103C, notification of a user ID is given by the signal processing apparatuses 1B and 1C. Then, the sites A, B, and C have access to one another through a subsequent process.

Further, in steps S139A, S139B, S139C, S143A, S143B, and S143C, each of the signal processing apparatuses 1 performs the sound acquisition process and the sound field reproduction process, similarly to steps S137 and S140 (see FIGS. 10 and 11). Here, transmission and reception of data between the signal processing apparatuses 1B and 1C are implemented by the mesh network without involving the portable management server 3".

<6. Effects>

As described above, in the acoustic system according to the present embodiment, the user can select a user with whom to privately converse from among a plurality of users in a conversation. At this time, since the acoustic system can recognize the selection request through the microphones 10, the cameras 30, or the IR thermal sensor 40 which are arranged nearby, it is unnecessary for the user to operate a smart phone or a mobile phone terminal. Further, since the acoustic system can recognize the selection request based on, for example, a voice volume, a language, a speaking speed, a gesture, or a position of the user, it is difficult for non-selected users to be aware of the selection request.

Further, the acoustic system can recognize selection of a certain user among a plurality of users located in the same space as the selection request. Thus, the user can privately converse with a desired user without the other users located in the same space being aware.

Further, in the multi-space access process performed in various forms, the user can converse with a desired other user using the same motion as a motion used to converse with a desired person in a conference in the related art. Thus, the user can intuitively use the acoustic system according to an embodiment of the present disclosure. For example, in the related art, the user privately converses by whispering to a desired person faintly. In the example in which the selection request is recognized based on a voice volume, when the user whispers at the same volume as in the related art, the user can privately converse with a desired other user. Further, for example, in the related art, the user approaches and privately converses with a desired person. In the example in which the selection request is recognized based on a change in the positional relation between the position to which the audio image is oriented and the user's position, similarly to the related art, when the user approaches the position to which the audio image is oriented, the user can privately converse with a desired other user.

<7. Conclusion>

As described above, the exemplary embodiments of the present disclosure have been described hereinbefore in detail with reference to the accompanying drawings, but the technical scope of the present disclosure is not limited to the embodiments. A person having ordinary skill in the art would understand that various modifications or variations can be made within the scope of the technical spirit defined in the claims and included within the technical scope of the present technology.

Additionally, the present disclosure may also be configured as below:

(1) An information processing system including:

an identifying unit that identifies a user and a target with whom the user requests to converse based on a signal detected by a first sensor arranged around the user;

a signal processing unit that performs predetermined signal processing on signals detected by the first sensor and a second sensor arranged around the target;

an output control unit that causes the signal detected by at least the second sensor and processed by the signal processing unit to be output to a first output unit arranged around the user; and a recognizing unit that recognizes, when a plurality of the targets are identified by the identifying unit, a selection request for selecting a specific target from among the plurality of targets based on the signal detected by the first sensor, wherein the output control unit causes the signal detected by the first sensor and processed by the signal processing unit to be output to a second output unit arranged around the specific target when the selection request is recognized by the recognizing unit.

(2) The information processing system according to (1), wherein the output control unit causes the signal detected by the second sensor arranged around the specific target among the plurality of targets to be output to the first output unit when the selection request is recognized by the recognizing unit.

(3) The information processing system according to (1) or (2), wherein the signal processing unit processes the signal detected by the second sensor arranged around the plurality of targets when the plurality of targets are identified by the identifying unit.

(4) The information processing system according to any one of (1) to (3), wherein the signal processing unit performs a synthesis process on the signal detected by the second sensor arranged around the plurality of targets when the plurality of targets are identified by the identifying unit.

(5) The information processing system according to any one of (1) to (4), wherein the signal includes an audio signal, wherein the first sensor and the second sensor each include a microphone, and wherein the first output unit and the second output unit each include a speaker outputting a sound.

(6) The information processing system according to (5), wherein the recognizing unit recognizes the selection request based on a voice volume of the user detected by the first sensor.

(7) The information processing system according to (5) or (6), wherein the recognizing unit recognizes the selection request based on a language of the user detected by the first sensor.

(8) The information processing system according to any one of (5) to (7), wherein the signal processing unit performs signal processing such that a voice output from the first output unit is oriented to a plurality of locations near a position of the user when the plurality of targets are identified by the identifying unit.

(9) The information processing system according to (8), wherein the recognizing unit recognizes the selection request based on a change in a positional relation between a position to which the voice output from the first output unit is oriented and the user's position detected by the first sensor.

(10) The information processing system according to any one of (5) to (9), wherein the recognizing unit recognizes the selection request based on whether or not the user's voice detected by the first sensor includes a predetermined word.

(11) The information processing system according to any one of (5) to (10), wherein the recognizing unit recognizes the selection request based on speaking speed of the user detected by the first sensor.

(12) The information processing system according to any one of (1) to (11), wherein the recognizing unit recognizes the selection request based on a motion of the user detected by the first sensor.

(13) The information processing system according to any one of (1) to (12), further including:

an input unit that receives the selection request input from the user, wherein the recognizing unit recognizes the selection request input through the input unit.

(14) The information processing system according to any one of (1) to (13), wherein the output control unit causes a notification signal to the user to be output to the first output unit when the recognizing unit recognizes the selection request.

(15) The information processing system according to any one of (1) to (14), wherein the information processing system performs an input and an output of a signal to and from a sensor and an output unit arranged in a predetermined space, wherein the sensor arranged in a predetermined space including the user is used as the first sensor, and the output unit arranged in the same space is used as the first output unit, and wherein the sensor arranged in a predetermined space including the target is used as the second sensor, and the output unit arranged in the same space is used as the second output unit.

(16) The information processing system according to any one of (1) to (14), wherein the information processing system performs input and output of a signal to and from sensors and output units arranged in a plurality of predetermined spaces, wherein the sensor arranged in the predetermined space including the user among the plurality of predetermined spaces is used as the first sensor, and the output unit arranged in the same space is used as the first output unit, and wherein the sensor arranged in the predetermined space including the target among the plurality of predetermined spaces is used as the second sensor, and the output unit arranged in the same space is used as the second output unit.

(17) The information processing system according to any one of (1) to (14), wherein the information processing system performs an input and an output of a signal to and from sensors and output units arranged around the user and the predetermined target among predetermined sensors and output units, wherein the sensors and the output units arranged around the user are used as the first sensor and the first output unit, respectively, and wherein the sensors and the output units arranged around the target are used as the second sensor and the second output unit, respectively.

(18) A non-transitory computer-readable storage medium having a program therein, for causing a computer to execute:

identifying a user and a target with whom the user requests to converse based on a signal detected by a first sensor arranged around the user, performing predetermined signal processing on signals detected by the first sensor and a second sensor arranged around the target, and causing the signal which has been detected by at least the second sensor and subjected to the signal processing to be output to a first output unit arranged around the user, and when a plurality of the targets are identified performing a synthesis process on the signal detected by the second sensor arranged around the plurality of targets, recognizing a selection request for selecting a specific target from among the plurality of targets based on the signal detected by the first sensor, and causing the signal which has been detected by the first sensor and subjected to the signal processing to be output to a second output unit arranged around the specific target.

The present disclosure contains subject matter related to that disclosed in Japanese Priority Patent Application JP 2012-205460 filed in the Japan Patent Office on Sep. 19, 2012, the entire content of which is hereby incorporated by reference.

What is claimed is:

1. An information processing system comprising:
    an identifying unit that identifies a user and a target with whom the user requests to converse based on a signal detected by a first sensor arranged around the user;
    a signal processing unit that performs predetermined signal processing on signals detected by the first sensor and a second sensor arranged around the target;
    an output control unit that causes the signal detected by at least the second sensor and processed by the signal processing unit to be output to a first output unit arranged around the user; and
    a recognizing unit that recognizes, when a plurality of the targets are identified by the identifying unit, a selection request for selecting a specific target from among the plurality of targets based on an audio signal detected by the first sensor,
    wherein the output control unit causes the signal detected by the first sensor and processed by the signal processing unit to be output to a second output unit arranged around the specific target when the selection request is recognized by the recognizing unit.

2. The information processing system according to claim 1, wherein the output control unit causes the signal detected by the second sensor arranged around the specific target among the plurality of targets to be output to the first output unit when the selection request is recognized by the recognizing unit.

3. The information processing system according to claim 1, wherein the signal processing unit processes the signal detected by the second sensor arranged around the plurality of targets when the plurality of targets are identified by the identifying unit.

4. The information processing system according to claim 1, wherein the signal processing unit performs a synthesis process on the signal detected by the second sensor arranged around the plurality of targets when the plurality of targets are identified by the identifying unit.

5. The information processing system according to claim 1, wherein the signal includes an audio signal,
    wherein the first sensor and the second sensor each include a microphone, and
    wherein the first output unit and the second output unit each include a speaker outputting a sound.

6. The information processing system according to claim 5, wherein the recognizing unit recognizes the selection request based on a voice volume of the user detected by the first sensor.

7. The information processing system according to claim 5, wherein the recognizing unit recognizes the selection request based on a language of the user detected by the first sensor.

8. The information processing system according to claim 5, wherein the signal processing unit performs signal processing such that a voice output from the first output unit is oriented to a plurality of locations near a position of the user when the plurality of targets are identified by the identifying unit.

9. The information processing system according to claim 8, wherein the recognizing unit recognizes the selection request based on a change in a positional relation between a position to which the voice output from the first output unit is oriented and the user's position detected by the first sensor.

10. The information processing system according to claim 5, wherein the recognizing unit recognizes the selection request based on whether or not the user's voice detected by the first sensor includes a predetermined word.

11. The information processing system according to claim 5, wherein the recognizing unit recognizes the selection request based on speaking speed of the user detected by the first sensor.

12. The information processing system according to claim 1, wherein the recognizing unit recognizes the selection request based on a motion of the user detected by the first sensor.

13. The information processing system according to claim 1, further comprising:
    an input unit that receives the selection request input from the user,
    wherein the recognizing unit recognizes the selection request input through the input unit.

14. The information processing system according to claim 1, wherein the output control unit causes a notification signal to the user to be output to the first output unit when the recognizing unit recognizes the selection request.

15. The information processing system according to claim 1,
    wherein the information processing system performs an input and an output of a signal to and from a sensor and an output unit arranged in a predetermined space,
    wherein the sensor arranged in a predetermined space including the user is used as the first sensor, and the output unit arranged in the same space is used as the first output unit, and
    wherein the sensor arranged in a predetermined space including the target is used as the second sensor, and the output unit arranged in the same space is used as the second output unit.

16. The information processing system according to claim 1,
    wherein the information processing system performs input and output of a signal to and from sensors and output units arranged in a plurality of predetermined spaces,
    wherein the sensor arranged in the predetermined space including the user among the plurality of predetermined spaces is used as the first sensor, and the output unit arranged in the same space is used as the first output unit, and
    wherein the sensor arranged in the predetermined space including the target among the plurality of predetermined spaces is used as the second sensor, and the output unit arranged in the same space is used as the second output unit.

17. The information processing system according to claim 1,
    wherein the information processing system performs an input and an output of a signal to and from sensors and output units arranged around the user and the target among predetermined sensors and output units,
    wherein the sensors and the output units arranged around the user are used as the first sensor and the first output unit, respectively, and wherein the sensors and the output units arranged around the target are used as the second sensor and the second output unit, respectively.

18. A non-transitory computer-readable storage medium having stored thereon, a set of computer-executable instructions therein, for causing a computer to perform a method comprising:

identifying a user and a target with whom the user requests to converse based on a signal detected by a first sensor arranged around the user, performing predetermined signal processing on signals detected by the first sensor and a second sensor arranged around the target, and causing the signal which has been detected by at least the second sensor and subjected to the signal processing to be output to a first output unit arranged around the user, and when a plurality of the targets are identified performing a synthesis process on the signal detected by the second sensor arranged around the plurality of targets, recognizing a selection request for selecting a specific target from among the plurality of targets based on an audio signal detected by the first sensor, and causing the signal which has been detected by the first sensor and subjected to the signal processing to be output to a second output unit arranged around the specific target.

* * * * *